United States Patent [19]
Guiver et al.

[11] Patent Number: 5,809,490
[45] Date of Patent: Sep. 15, 1998

[54] APPARATUS AND METHOD FOR SELECTING A WORKING DATA SET FOR MODEL DEVELOPMENT

[75] Inventors: John P. Guiver, Pittsburgh; Casimir C. Klimasauskas, Sewickley, both of Pa.

[73] Assignee: Aspen Technology Inc., Cambridge, Mass.

[21] Appl. No.: 642,779

[22] Filed: May 3, 1996

[51] Int. Cl.⁶ .................................................. G06F 15/18
[52] U.S. Cl. ............................................. 706/16; 706/25
[58] Field of Search .................................... 395/11, 24, 22, 395/23

[56] References Cited

U.S. PATENT DOCUMENTS

| | | | |
|---|---|---|---|
| 5,111,531 | 5/1992 | Grayson et al. | 395/23 |
| 5,142,612 | 8/1992 | Skeirik | 395/11 |
| 5,159,660 | 10/1992 | Lu et al. | 395/22 |
| 5,263,120 | 11/1993 | Bickel | 395/11 |
| 5,276,771 | 1/1994 | Manukian et al. | 395/24 |
| 5,335,291 | 8/1994 | Kramer et al. | 382/158 |
| 5,353,207 | 10/1994 | Keeler et al. | 364/164 |
| 5,386,373 | 1/1995 | Keeler et al. | 364/577 |
| 5,428,644 | 6/1995 | Kohonen | 375/340 |
| 5,465,320 | 11/1995 | Enbutsu et al. | 395/22 |
| 5,477,444 | 12/1995 | Bhat et al. | 364/152 |
| 5,479,576 | 12/1995 | Watanabe et al. | 395/23 |

OTHER PUBLICATIONS

Geladi, Paul, et al., "Partial Least–Squares Regression: A Tutorial", Analytica Chimica Acta, 185 (1986) pp. 1–17.

Serth, R.W., et al., "Gross Error Detection and Data Reconciliation in Steam–Metering Systems", A.I.Ch.E. Journal, May 1986, vol. 32, No. 5, pp. 733–742.

Serth, R.W., et al., "Detection of Gross Errors in Nonlinearly Constrained Data: A Cast Study", Chem. Eng. Comm. 1987, vol. 51, pp. 89–104.

Moody, J., et al., "Learning with Localized Receptive Fields", Yale University of Dept. of Computer Science, Sep. 1988, pp. 1–11.

Wold, Svante, et al., "Nonlinear PLS Modeling", Chemometrics and Intelligent Laboratory Systems, 7 (1989), pp. 53–65.

(List continued on next page.)

*Primary Examiner*—Emanuel Todd Voeltz
*Assistant Examiner*—Matthew Smithers
*Attorney, Agent, or Firm*—Pravel, Hewitt & Kimball

[57] ABSTRACT

The present invention provides a data selection apparatus which augments a set of training examples with the desired output data. The resulting augmented data set is normalized such that the augmented data values range between −1 and +1 and such that the mean of the augmented data set is zero. The data selection apparatus then groups the augmented and normalized data set into related clusters using a clusterizer. Preferably, the clusterizer is a neural network such as a Kohonen self-organizing map (SOM). The data selection apparatus further applies an extractor to cull a working set of data from the clusterized data set. The present invention thus picks, or filters, a set of data which is more nearly uniformly distributed across the portion of the input space of interest to minimize the maximum absolute error over the entire input space. The output of the data selection apparatus is provided to train the analyzer with important sub-sets of the training data rather than with all available training data. A smaller training data set significantly reduces the complexity of the model building or analyzer construction process.

33 Claims, 7 Drawing Sheets

OTHER PUBLICATIONS

Kramer, et al., "Diagnosis Using Backpropagation Neural Networks—Analysis and Criticism", Computers Chem. Engng., vol. 14, No. 2, 1990, pp. 1323–1338.

Helland, Kristian, et al., "Recursive algorithm for partial least squares regression", Chemometrics and Intelligent Laboratory Systems, 14 (1991), pp. 129–137.

Puskorius, G.V., et al., "Decoupled Extended Kalman Filter Training of Feedforward Layered Networks", IEEE, 1991, pp. I–771–I–777.

Kohonen, Teuvo, et al., LVQ_PAK: A program package for the correct application of Learning Vector Quantization algorithms, IEEE, 1992, pp. I–725–I–730.

Plutowski, et al., "Selecting concise training sets from clean data", Feb. 1992, pp. 1–45.

Qin, S.J., et al., "Nonlinear PLS Modeling Using Neural Networks", Computers Chem. Engng., vol. 16, No. 4, 1992, pp. 379–391.

Su, Hong–Te, et al., "Integrating Neural Networks with First Principles Models of Dynamic Modeling", IFAC Symp. on DYCOR+, 1992, pp. 77–82.

Kramer, Mark A., et al., "Embedding Theoretical Models in Neural Networks", 1992, ACC/WA14, pp. 475–479.

Kramer, M.A., "Autoassociative Neural Networks", Computers Chem. Engng., vol. 16, No. 4, 1992, pp. 313–328.

deJong, Sijmen, "SIMPLS: an alternative approach to partial least squares regression", Chemometrics and Intelligent Laboratory Systems, 18 (1993), pp. 251–263.

Klimasauskas, C., "Developing a Multiple MACD Market Timing System," Advanced Technology for Developers, vol. 2, Special Issue, 4 Qtr. 1993, pp. 1–47.

Thompson, Michael L., et al., "Modeling Chemical Processes Using Prior Knowledge and Neural Networks", A.I.Ch.E. Journal, Aug. 1994, vol. 40, No. 8, pp. 1328–1340.

Haykin, Simon, "Neural Networks Expand SP's Horizons", IEEE Signal Processing Magazine, Mar. 1996, pp. 24–49.

Mulgrew, Bernard, "Applying Radial Basis Functions", IEEE Signal Processing Magazine, Mar. 1996, pp. 50–65.

Jain, Anik K., et al., Artificial Neural Networks: A Tutorial, Computer, Mar. 1996, vol. 29, No. 3, pp. 31–44.

Shang, Yi and Wah, Benjamin, "Global Optimization for Neural Network Training", Computer, Mar. 1996, vol. 29, No. 3, pp. 45–54.

Serbedzija, Nikola B., "Simulating Artificial Neural Networks on Parallel Architecture", Computer, Mar. 1996, vol. 29, No. 3, pp. 57–63.

Tan, Chew Lim, et al., "An Aritificial Neural Network that Models Human Decision Making", Computer, Mar. 1996, vol. 29, No. 3, pp. 64–70.

Setiono, Rudy, et al., "Symbolic Representation of Neural Networks", Computer, Mar. 1996, vol. 29, No. 3, pp. 71–77.

Zhao, Hong, et al., "Modeling of Activated Sewage Wastewater Treatment Processes Using Integrated Neural Networks and a First Principle Model", IFAC, 13th World Congress, 1996, pp. 1–5.

Westinghouse Electric Corporation, Descriptive Bulletin 21–161, WDPFII System Overview, pp. 1–5.

Westinghouse Electric Corporation, Descriptive Bulletin 21–196, WDPFII WEStation Historian, pp. 1–4.

Westinghouse Electric Corporation, Descriptive Bulletin 21–188, WDPFII Distributed Processing Unit—Series 32, pp. 1–4.

Westinghouse Electric Corporation, Descriptive Bulletin 21–195, WEStation OpCon, pp. 1–4.

Westinghouse Electric Corporation, Descriptive Bulletin DB21–206, Standard Algorithms, pp. 1–8.

Westinghouse Electric Corporation, Descriptive Bulletin 21–189, WDPFII Westnet II Plus Data Highway, pp. 1–2.

Westinghouse Electric Corporation, Descriptive Bulletin 21–177, WDPFII Q–Line Process I/O, pp. 1–2.

White, David A., and Sofge, Donald A. (Ed.), Handbook of Intelligent Control, (pp. 283–356).

APPARATUS AND METHOD FOR SELECTING A WORKING DATA SET FOR MODEL DEVELOPMENT

FIELD OF THE INVENTION

The invention relates to an apparatus and a method for selecting data, and more specifically, to an apparatus and a method for selecting working data from a full data set for model development.

BACKGROUND OF THE INVENTION

In a number of system modeling applications where first principles, analytical, or expert knowledge about the actual structure of the system to be modeled is lacking or inadequate, data driven analyzers may be applied in place of conventional analyzers. These data driven analyzers may incorporate a number of models such as parametric statistical models, non-parametric statistical models, clustering models, nearest neighbor models, regression methods, and engineered (artificial) neural networks. Typical applications include handwriting recognition, speech recognition, image recognition, financial modeling, financial forecasting, target marketing and process control in various manufacturing facilities such as power plants, chemical plants and refineries, among others.

Prior to operation, data driven analyzers or models need to be built using one or more training sessions. The data used to build the analyzer or model in these sessions are typically referred to as training data. As data driven analyzers are developed by examining only training examples, the selection of the training data can significantly affect the accuracy and the learning speed of the data driven analyzer. One approach used heretofore generates a separate data set referred to as a test set for training purposes. The test set is used to avoid overfitting the model or analyzer to the training data. Overfitting refers to the situation where the analyzer has memorized the training data so well that it fails to fit or categorize unseen data. Overfitting is a common problem in data driven analyzers or models.

Typically, during the construction of the analyzer or model, the analyzer's performance is tested against the test set. The selection of the analyzer or model parameters is performed iteratively until the performance of the analyzer in classifying the test set reaches an optimal point. At this point, the training process is completed. An alternative to using an independent training and test set is to use a methodology called cross-validation. Cross-validation can be used to determine parameter values for a parametric analyzer or model for a non-parametric analyzer. In cross-validation, a single training data set is selected. Next, a number of different analyzers or models are built by presenting different parts of the training data as test sets to the analyzers in an iterative process. The parameter or model structure is then determined on the basis of the combined performance of all models or analyzers. Under the cross-validation approach, the analyzer or model is typically retrained with data using the determined optimal model structure.

The quality of the above-mentioned analyzers or models is critically dependent on the selection of training data or test sets. In many cases, a large amount of data is collected and is available for building the model or constructing the analyzer. Ideally, the training data should cover the entire region where new data may be fitted into. However, for practical reasons, limitations may exist on the quality of data available for training the analyzer.

These limitations may exist where the data may be inherently rare, or may be expensive to collect, or may simply have been drowned out by populated data clusters which do not significantly affect the decisions of the analyzer. For example, in many industrial processes, steady state conditions can exist for a very long duration. In contrast, disturbance conditions occurs on a much more infrequent basis. As data collected during the steady state conditions are not as interesting as data collected during the disturbance condition, it is important that these rare but critical events be included in the training set. Further, it is important that the data associated with the steady state condition mentioned above be pruned out so that the rarer, more important data during the disturbance condition can be focused on during training to improve the accuracy and the training speed.

SUMMARY OF THE INVENTION

The present invention provides a data selection apparatus which augments a set of training examples with the desired output data. The resulting augmented data set is normalized such that the augmented data values range between −1 and +1 and such that the mean of the augmented data set is zero. The data selection apparatus then groups the augmented and normalized data set into related clusters using a clusterizer. Preferably, the clusterizer is a neural network such as a Kohonen self-organizing map (SOM). The data selection apparatus, or data selector, further applies an extractor to cull a working set of data from the clusterized data set.

By augmenting and subsequently clustering the input vector with the target outputs for the model to be developed, the data selection apparatus of the present invention picks a set of data which is more nearly uniformly distributed across the portion of the input space of interest. The present invention effectively filters out data in portions of the data space with a heavy distribution of data or examples in favor of those with fewer data or examples. Thus, these models effectively minimize the maximum absolute error over the entire space. For modeling techniques which minimize sum squared error or more generally r-Minkowski error measures, the data selection apparatus of the present invention results in models which perform better over the entire space.

The analyzer is subsequently trained with important subsets of the training data rather than with all available training data. A smaller data set significantly reduces the model building or analyzer construction process. This in turn increases the scope of the training to allow for further optimization of model types and structures for the analyzer.

BRIEF DESCRIPTION OF THE DRAWINGS

A better understanding of the present invention can be obtained when the following detailed description of the preferred embodiment is considered in conjunction with the following drawings, in which.

DESCRIPTION OF THE PREFERRED EMBODIMENT

Figure 1:
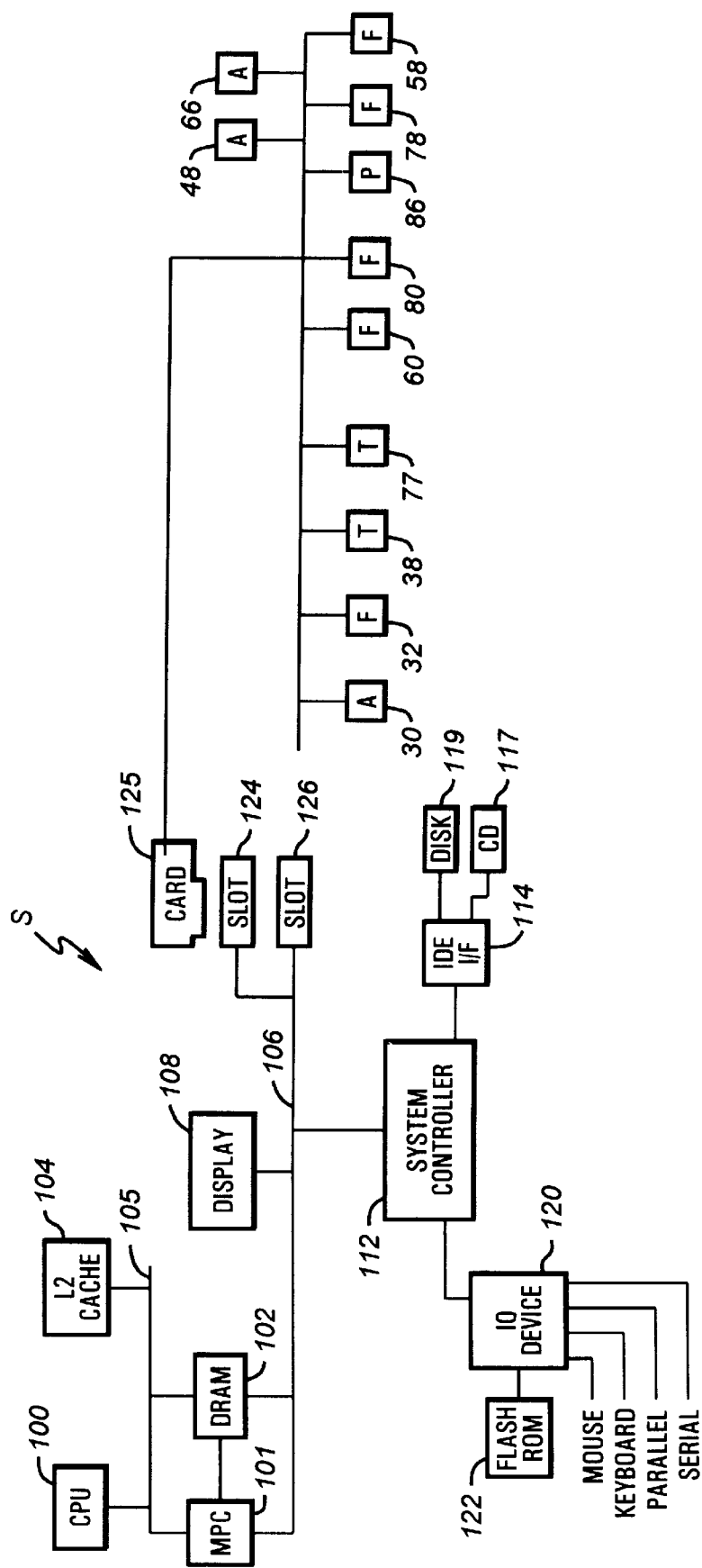
FIG. 1 is a block diagram of a computer system functioning as the data selector according to the present invention.

Turning now to the drawings, FIG. 1 is a representative computer system S which provides the processing capability for the data selection apparatus of the present invention. Although the computer system S is shown as a high performance IBM compatible personal computer, any other suitable processing environments may be used, including workstations, minicomputers, mainframes, or supercomputers.

In FIG. 1, the system S has a CPU or a processor 100 connected to a level two (L2) cache 104. The L2 cache 104 provides additional caching capabilities to the processor's on-chip cache to improve performance. Both the processor 100 and the L2 cache 104 are connected to a high speed local bus 105. The processor 100 of the preferred embodiment is a Pentium microprocessor manufactured by Intel Corporation of Santa Clara, Calif. In the preferred embodiment, the processor operates with a standard IBM-PC compatible operating system, such as MS-DOS or Windows, available from Microsoft Corporation of Redmond, Wash.

In addition to the CPU 100 and cache 104, a number of memory interface and memory devices are connected between the local bus 105 and a PCI bus 106. These devices include a memory to PCI cache controller (MPC) 101 and a dynamic random access memory (DRAM) array 102. The MPC 101 is connected to the DRAM array 102 to collectively form a high performance memory system for the computer system S. A display 108 is also connected to the PCI bus 106.

A plurality of PCI slots 124 and 126 are provided to accept PCI expansion cards and to interface these cards into the PCI bus 106. The expansion card may support a number of data collection instruments. The data collected varies according to the type of product being produced. For illustrative purposes, FIG. 1 shows the architecture of the computer supporting various process control data collection devices such as various sensors and output drivers in a representative plant.

In the embodiment disclosed here, the representative plant is a refinery or a chemical processing plant having a number of process variables such as temperature and flow rate variables. These variables are sensed by various instruments. As shown in FIG. 1, in the event that the computer system is operating in a chemical plant, the collected data may include various disturbance variables such as a feed stream flow rate as measured by a flow meter 32, a feed stream temperature as measured by a temperature sensor 38, component feed concentrations as determined by an analyzer 30, and a reflux stream temperature in a pipe as measured by a temperature sensor 71. The collected data can also include controlled process variables such as the concentration of produced materials, as measured by analyzers 48 and 66. The collected data further may include manipulated variables such as the reflux flow rate as set by a valve 80 and determined by a flow meter 78, a reboil steam flow rate as set by a valve 60 and measured by a flow meter 58 and the pressure in a tank as controlled by a valve 86.

It is to be understood that the description of data to be collected such as the reflux flow rate and the reboil steam flow rate are associated with the operations of the chemical plant and has only been provided as examples of the types of variables to be collected. The techniques and processes according to the present invention can be utilized in a wide range of technological arts, such as speech recognition, image recognition, financial modeling, target marketing, and various process control applications in oil refineries, chemical plants, power plants and industrial manufacturing plants, among others. Thus, the present invention is not to be construed as limited to the description of specific embodiments. As noted above, the present invention is adapted to be practiced within the full range of technological arts.

The PCI bus 106 is also connected to a system controller 112. The system controller 112 is a PCI to ISA bus bridge. Preferably the system controller 112 provides a PCI bus master and slave controller, an ISA bus controller, DMA devices, and an IDE disk interface. The system controller 112 is also connected to an IDE interface port 114 for driving one or more hard disk drives, preferably a CD-ROM player 117 and a disk drive 119.

The system controller 112 is connected to an Input/Output (I/O) chip 120. The I/O chip 120 is connected to a flash ROM 122 which contains boot-up information for the computer system S. Additionally, the I/O device 120 provides a parallel port, a serial port, a keyboard interface and a mouse interface, among others, for the computer system S.

Figure 2:
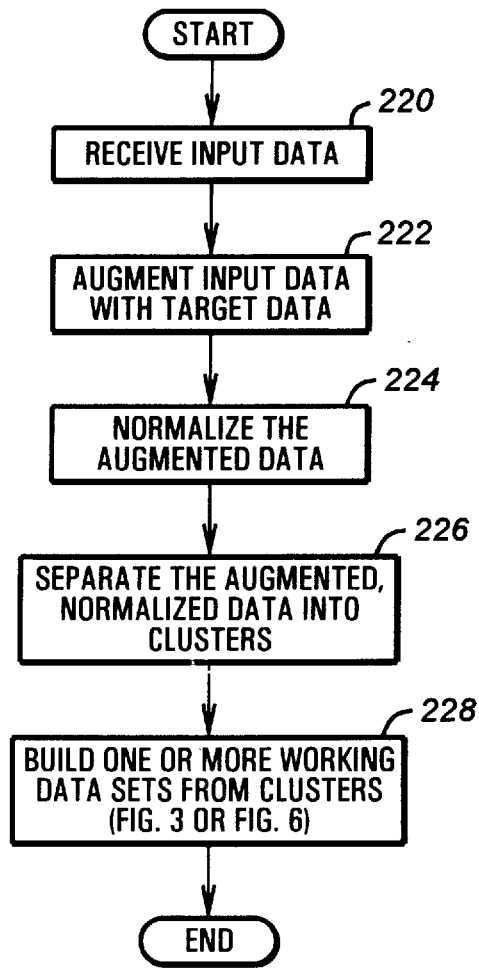
FIG. 2 is a flow chart illustrating the process of selecting data using the data selector of FIG. 1.

Turning now to FIG. 2, the operation of the data selection apparatus of the present invention is shown. The data selection apparatus of FIG. 2 selects a working set of data from a full set of data for developing models. The product generated by the data selection apparatus of the present invention may be used by a suitable data driven analyzer such as that discussed in a co-pending patent application having application Ser. No. 08/642,725, entitled "HYBRID LINEAR-NEURAL NETWORK PROCESS CONTROL" and commonly assigned to the assignee of the present invention, hereby incorporated by reference. It is to be noted that when the computer of FIG. 1 is operating under the control of the routine shown in FIG. 2, the computer of FIG. 1 is a new and improved data selection apparatus which improves the training of data driven analyzers.

In FIG. 2, the data selection apparatus acquires input data in step 220. The input data is further selected such that the data used in the modeling process may only be a sub-set of the potential data available. Next, the data selection apparatus of the invention augments the input data with the target output in step 222. In step 222, the output variables are preferably appended to the input variables to form the data space prior to the normalization step 224. The output variables represent outcomes of the model and as such it is important that the training set include data that is representative of the output space. The importance of certain output variables can be increased by adding more weight to their contribution to the distance function used in the clusterizer of step 226, as discussed below. In the asymptotic case, only output variables are used during the clustering step 226. Further, the present invention contemplates that the data may be selected such that only a portion of the potential data available as well as a portion of the outputs will be used.

In step 224, the routine normalizes the augmented data. Preferably, the variables are normalized so that they are mean zero, and have values between −1 and +1. The normalization is accomplished by subtracting the mean and dividing by a number which is preferably selected from a range of two to three times the standard deviation of the variables.

The data selection apparatus then separates the augmented, normalized data into related groups using a clusterizer in step 226. Optionally, the individual input or output variables can be transformed using non-linear functions known to those skilled in the art to have a distribution that is closer to being uniform or normal or to some other desired distribution. The optional univariate non-linear transformations can enhance the effectiveness of the clusterizer by spreading out the data to span the boundaries of the data space.

In step 226, the number of clusters is typically determined as a fraction of the total data. Alternatively, the number of clusters may be determined experimentally by iteration. In the preferred embodiment, a self organizing map (SOM) clusterizer is initially driven to perform an equi-probable clustering. The equi-probable clustering is relaxed as the iterative nature of the clustering algorithm proceeds so that the resulting clusters are distributed at representative points around the augmented data space. Although equi-probable clusterizers are used, the clusterizer may also use a weighted clustering methods which are not based on the equi-probable clustering approach.

Additionally, in another embodiment, after the clustering process has been performed, each example or data in the training set is matched to a cluster based only on the input portion of the data. An analyzer or model is built for each individual data cluster. Afterward, the composite model assigns the new data input to a cluster before it uses the model associated with the cluster to create an output.

The data selection apparatus then builds one or more working data sets from the clusters formed in step 226 using a data extractor in step 228. In the data extractor of the preferred embodiment, a cut-off level K is selected as some fraction of the average number of examples per cluster such as 70%. In a round robin fashion, data is picked at random from each cluster until there is no more data associated with the cluster, or the desired number of examples have been selected from the cluster. Alternatively, K data examples can be picked from each cluster at random starting with the first cluster and proceeding to the next. If the cluster has fewer than K values, all of the data examples are selected. After performing step 228, the routine simply exits.

The analyzer is subsequently trained with the thus selected sub-sets of the training data rather than with all available training data. A smaller data set significantly reduces the model building or analyzer construction process. This in turn increases the scope of the training to allow for further optimization of model types and structures for the analyzer.

By augmenting and subsequently clustering the input vector with the target outputs for the model to be developed, the data selection apparatus of the present invention picks a set of data which is more nearly uniformly distributed across the portion of the input space of interest. The data selection apparatus of the present invention thus filters out data in portions of the data space that is heavily populated with data in favor of those with few data or examples.

For modeling techniques which minimize sum squared error (or more generally r-Minkowski error) measures, the data selection apparatus of the present invention results in models which perform better over the entire space as these models effectively minimizes the maximum absolute error over the entire space. The data selection apparatus of the present invention thus works well with any modeling technique based on data which optimizes a single composite measure over all of the data used to estimate the model, but the final solution must predict equally well over all the known examples. The model to be developed using this working set may be of any data-derived form of model: linear, neural, polynomial, rational polynomial.

Figure 3:
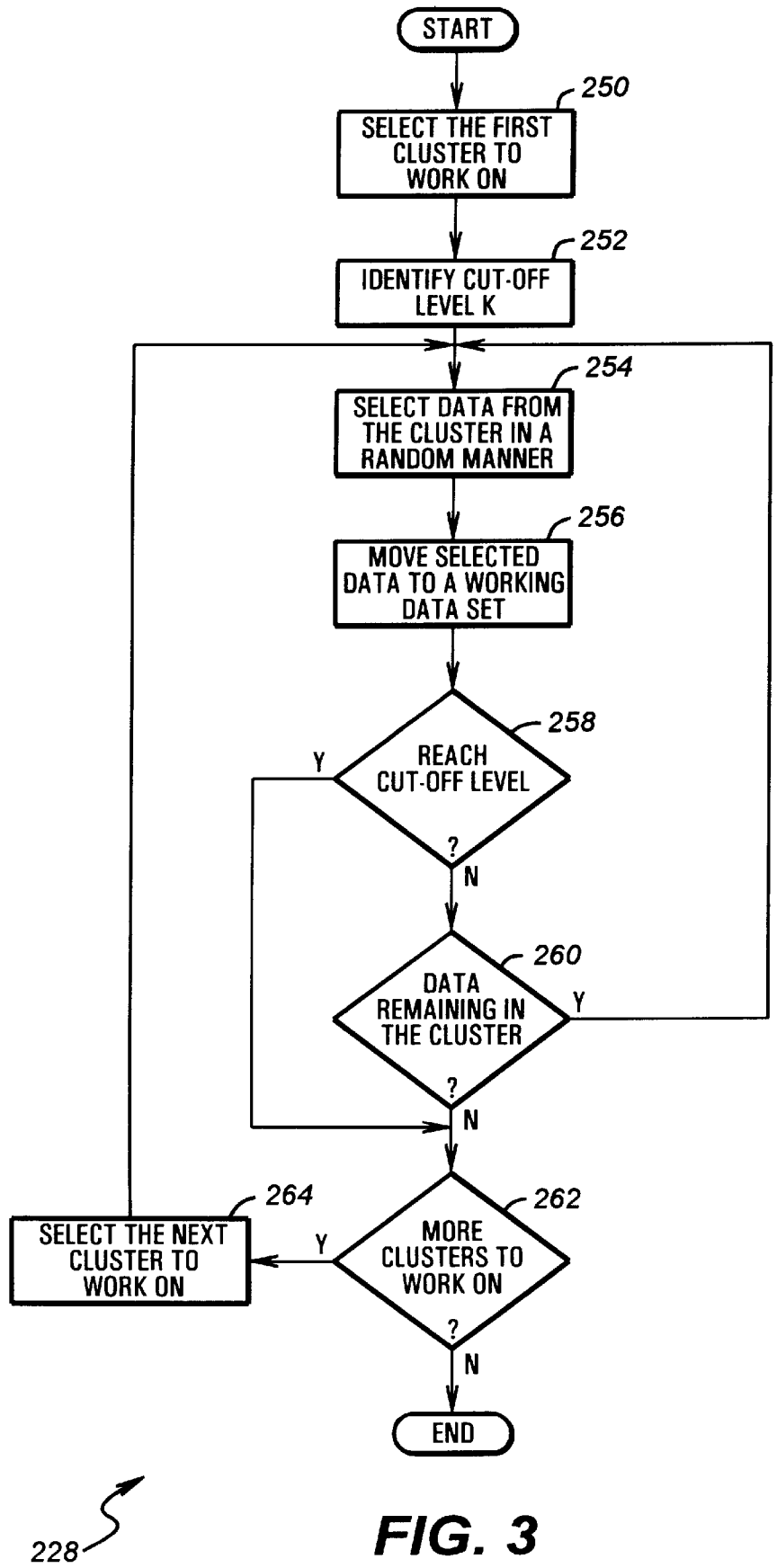
FIG. 3 is a flow chart illustrating the process of building the data set in FIG. 2.

Turning to FIG. 3, one embodiment of the data extractor for selectively moving data from its respective cluster in step 228 is shown in more detail. In FIG. 3, the routine selects a first cluster to work on in step 250. It also computes a cutoff level K in step 252. As previously indicated, the cut-off level K is selected as some fraction of the average number of examples per cluster such as 70%. Additionally, the present invention also contemplates that an iterative approach can be used to determine K. Using this approach, the clusterized data is used to create one analyzer or model while a sub-set of the data, preferably a subset with a new cut-off level K, is picked and used to create a second analyzer or model. This process can be performed in many iterations. The cut-off level K which results in the best performing analyzer or model is used to create the final analyzer or model.

In step 254, the routine selects data from the cluster in a randomized manner. In step 256, the routine moves a selected group of data into the working data set. Next, in step 258, the routine tests to see if the quantity of data moved into the model data set has reached the cut-off level K in step 258. If not, the routine then checks to see if there is any data remaining in the cluster to be moved in step 260. If additional data needs to be moved in step 260, the routine loops back to step 254 to continue clustering the data. Alternatively, from step 258, if the data move has reached the cutoff level K, or alternatively, from step 260, no data exists to be moved in the cluster, the routine moves to step 262. In step 262, the routine checks to see if additional clusters need to be worked on. If so, the routine selects the next cluster to work on in step 264 before it loops back to step 254 to continue clustering the data. Alternatively, if no clusters remain to be worked on in step 262, the routine exits.

Figure 4:
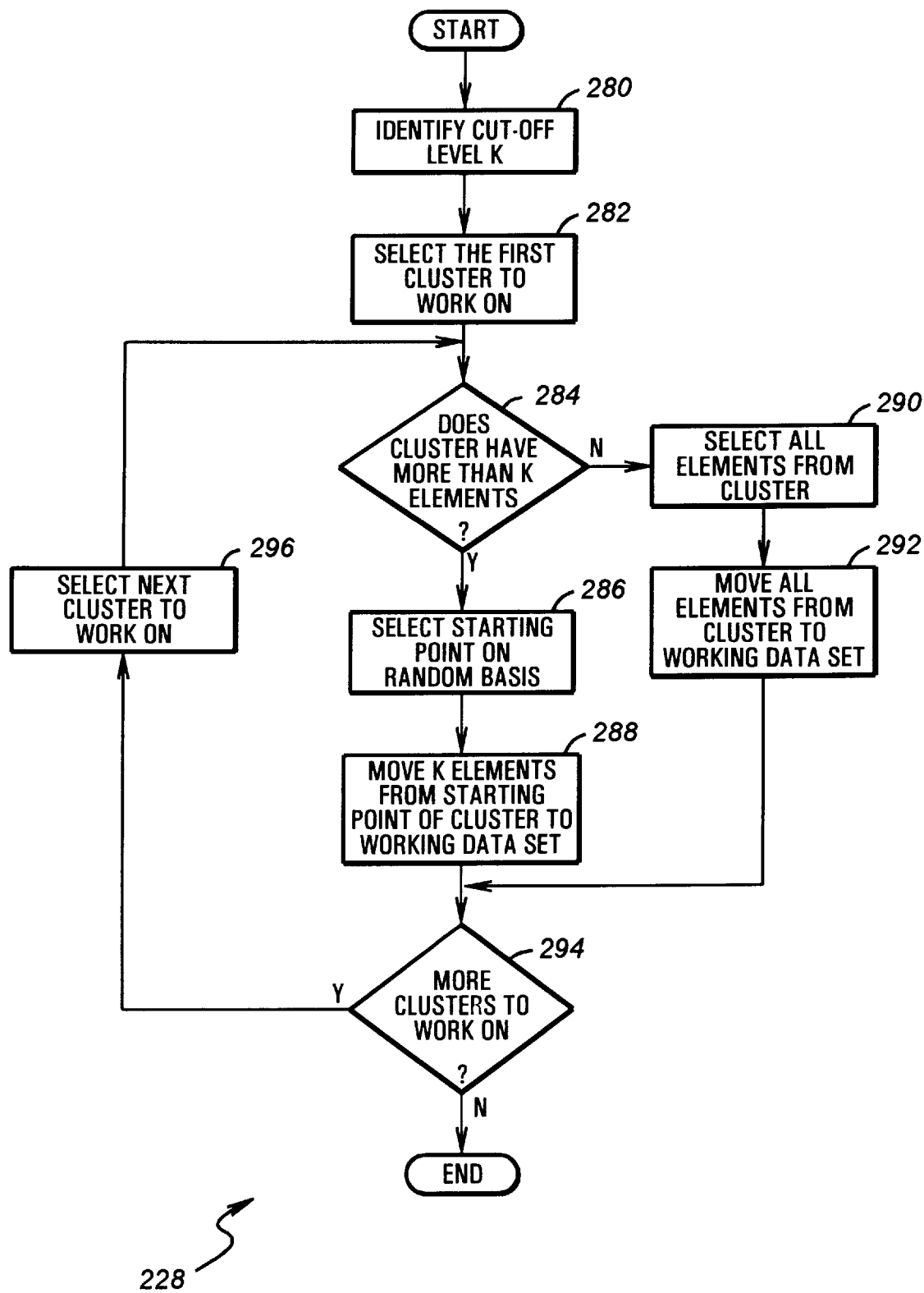
FIG. 4 is a flow chart illustrating an alternative process in the data set building step in FIG. 2.

FIG. 4 is an alternative embodiment of the extractor for selectively moving data from its respective cluster in step 228. In FIG. 4, the routine identifies the cutoff level K in step 280. In contrast to the embodiment of FIG. 3 which selects the cut-off level K as some fraction of the average number of examples per cluster, step 280 uses a predetermined constant value for K.

Next, the routine selects the first cluster to work on in step 282. In step 284, the routine checks to see of the cluster has more than K elements of data in it. If so, the routine selects the starting index into the cluster on a random basis in step 286. Then, in step 288, the routine copies a number of K data elements, starting from the index point of the cluster, to the working data set.

Alternatively, from step 284, if the cluster does not have more than K data points, the routine simply selects all data elements from the current cluster in step 290. It then moves all data elements from the cluster to the working data set in step 292.

From either step 288 or step 292, the routine determines whether or not additional clusters need to be worked on in step 294. If so, the routine selects the next cluster to work on in step 296 and jumps to step 284 to continue the model building process. Alternatively, if all clusters have been worked on, the routine exits.

Figure 5:
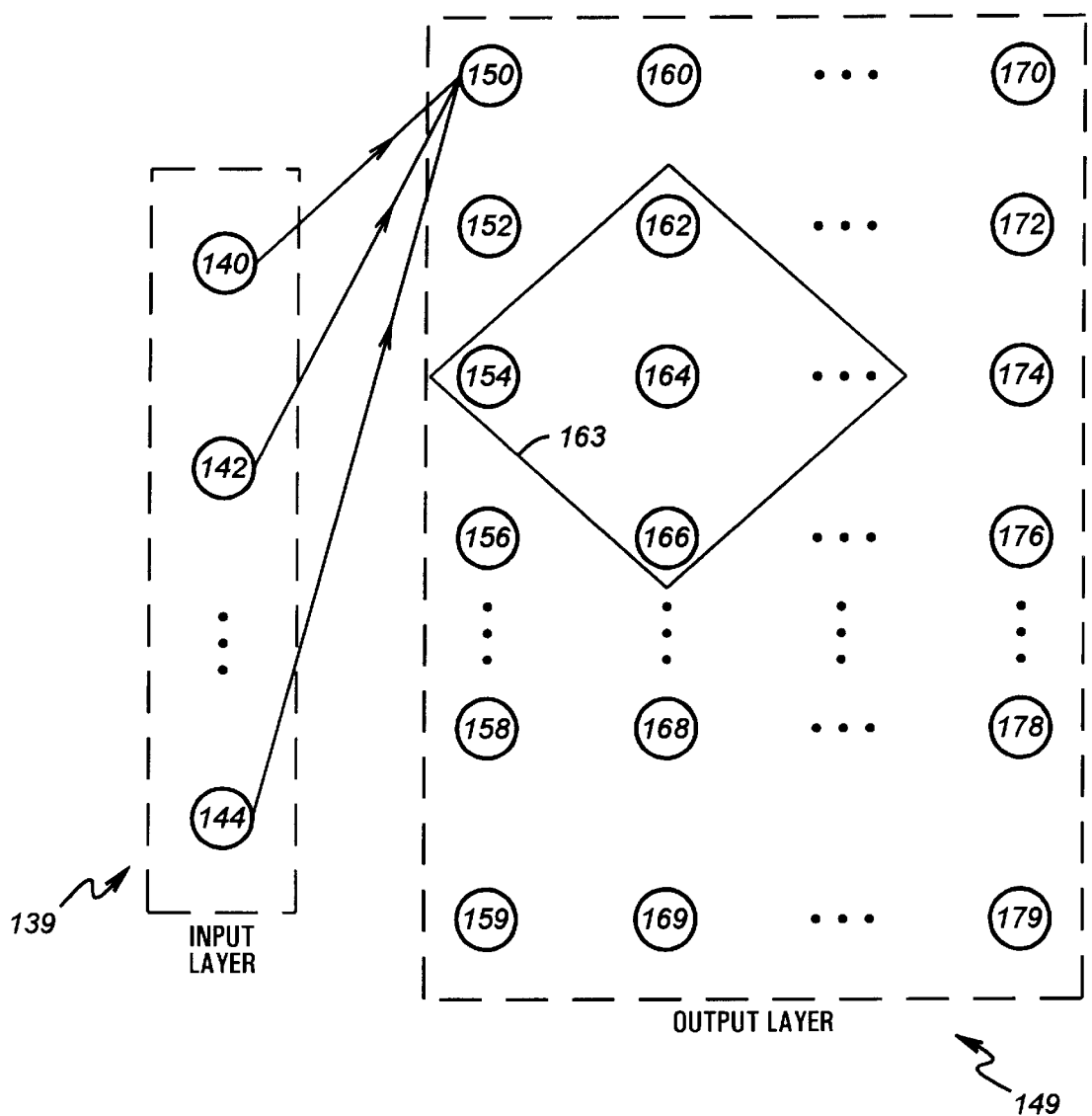
FIG. 5 is a block diagram illustrating the clusterizer of FIG. 2.

Turning now to the clusterizer of step 226, the clusterizer is preferably a neural network known by those skilled in the art as a Kohonen self organizing map (SOM), shown in more detail in FIG. 5. The Kohonen SOM is an unsupervised learning network which transforms a P dimensional input pattern to a Q dimensional discrete map in a topologically ordered fashion. Typically, Q is a one or two dimensional discrete map. In the Kohonen SOM, input points that are close in the P dimension are mapped close together on the Q dimension lattice. Each lattice cell is represented by a neuron associated with a P dimensional adaptable weight vector. The match between each weight factor is computed with every input. The best matching weight factor and some of its topological neighbors are then adjusted to better match the input points. The Kohonen SOM offers the desirable property of topology preservation where nearby input patterns activate nearby output units on the map. Such networks have been used for generating semantic maps, graph partitioning and clustering where high dimensional, complex information is compressed into an ordered fashion by reducing the dimensionality of the information without loss of knowledge about interrelationship of data.

Referring now to FIG. 5, the Kohonen SOM is organized as a two-dimensional grid or array of neurons having an input layer 139 and an output layer 149. The input layer 139 has a plurality of input neurons 140, 142 and 144. Similarly, the output layer 149 has a plurality of individual output neurons 150 through 179. Each of the neurons 140 through 144 of the input layer 139 is fully connected to each of the neurons 150 through 179 of the output layer 149.

Additionally, each of the neurons in the output layer 149 is associated with a spatial neighborhood. As shown in FIG. 5, the spatial neighborhood 163 encompasses neurons 154, 162, 164 and 166, among others. The spatial neighborhood 163 allows a winning neuron, preferably a Euclidean-based winning neuron as defined below, to prohibit neurons outside of the neighborhood 163 from acting and to excite only the neurons in its immediate neighborhood 163 or those physically closest to the neuron. Thus, only the winner and its neighbors within the neighborhood 163 can learn and adjust their weights. Once the winning neuron is chosen, the weight of the winning neuron must be adjusted and all units within its neighborhood are also adjusted.

The shape of the spatial neighborhood 163 is preferably square, rectangular, or circular. The initial neighborhood size of the SOM is preferably set from ½ to ⅔ of the SOM network size. This neighborhood size is shrunk over time according to a schedule, preferably one with an exponentially decreasing function, as discussed below.

Figure 6:
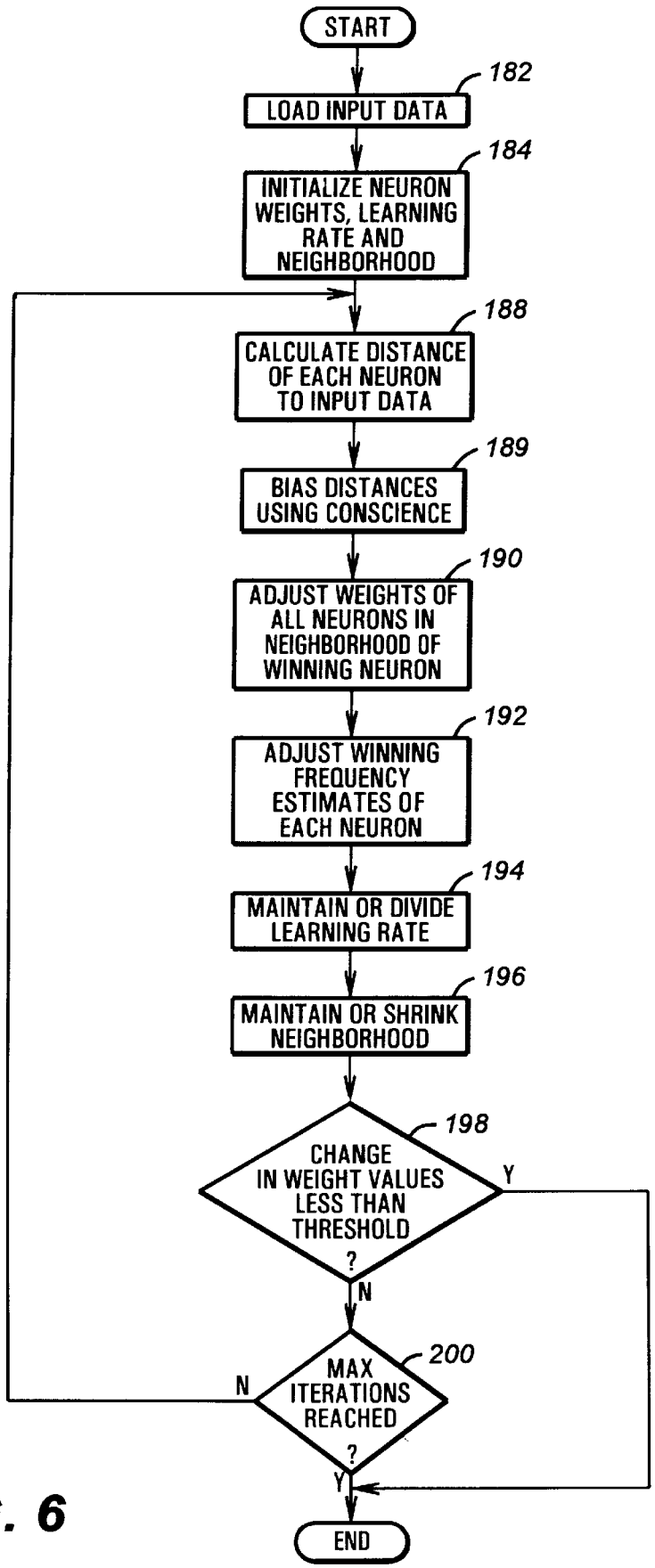
FIG. 6 is a flow chart illustrating the process of training the clusterizer of FIG. 5.

Prior to using the Kohonen SOM clusterizer, the SOM needs to be trained. FIG. 6 shows the routine to train the Kohonen SOM of FIG. 5 in more detail. In FIG. 6, the input data x is loaded in step 182. Next, the weights of the SOM network is initialized in step 184. The initial weights of the SOM network may be chosen using a number of strategies. Preferably, the initial weights are selected using a random number generator.

In step 188, the routine determines the winning neuron for the particular input data by selecting the unit at location (i,j) in the two-dimensional output layer 149 (FIG. 5) with the minimum output. Preferably, the input data X, which for the current invention includes the target outputs, has M values and is denoted by:

$$X=(x_1, x_2, \ldots, x_M)$$

Further, each Kohonen SOM neuron i will also have M weight values which are denoted by:

$$W=(w_{i1}, w_{i2}, \ldots, w_{iM})$$

The use of i and j denotes the n-dimensional vector associated with the units at location (i,j) of the two dimensional output layer 149 (FIG. 5).

Each neuron computes the Euclidean distance between the input vector X and the store weight vector W. Now the Euclidean distance $D_i$ is computed for each of the N Kohonen neurons.

$$D_i = \|X - W_i\| = \sqrt{(x_1 - w_{i1})^2 + (x_2 - w_{i2})^2 + \ldots + (x_M - w_{iM})^2}$$

The neuron with the lowest value of $D_i$ is selected as the winner. Additionally, in the event that the influence of the output variables is to be increased for the purpose of cluster creation, the output variables can be magnified by giving more weight to their contributions to the distance function shown above. Once the neuron with the smallest adjusted distance has been determined, the routine then determines the remaining neurons whose weights need to be adjusted. The neurons to be adjusted is determined using a neighborhood function, as discussed below.

Next, the conscience mechanism of step 189 minimizes the risk that a few neurons can end up representing too much of the input data. This situation could arise due to the initial randomization of the Kohonen neuron weights. In this case one neuron might end up representing all the data and little information about the clusters in the input data would be found in the Kohonen SOM's output layer. The conscience mechanism depends on keeping a record of how often each Kohonen neuron wins and this information is then used during training to bias the distance measurement.

If a neuron has won more than 1/N fraction of the time (where N is the number of Kohonen neurons) then its distance is adjusted upward to decrease its chance of winning—in fact, the adjustment is proportional to how much more frequency than average the neuron has won. Also if a neuron has won less than 1/N fraction of the time, then its distance is decreased to make it more likely to win.

In step 189, the routine also biases the distance measurements to encourage neurons that are not winning with an average frequency and, of course, to discourage neurons that are winning at an above average frequency. The conscience mechanism helps develop a uniform data representation in the SOM layer.

The adjusted distance $D_i'$ simply is the distance minus a bias. The bias, denoted by $B_i$ is computed using the following formula:

$$B_i = \gamma(N \cdot F_i - 1)$$

where $F_i$ is the frequency with which the neuron i has historically won, and N is the number of neurons in the SOM layer.

At initialization, $$F_i = \frac{1}{N} \text{ so that initially } B_i = 0.$$

Once $B_i$ and $D_i$ have been computed, the adjusted distance, $D_i'$ can be computed as:

$$D_i' = D_i + B_i$$

Thus, when $$F_i < \frac{1}{N}, B_i < 0 \text{ and } D_i'$$

is decreased so that the neuron i's chance of winning is increased. Alternatively, when $F_i > 1/N$, $D_i'$ is increased so that the respective neuron i's chance of winning is decreased.

The conscience mechanism helps the Kohonen layer achieve another benefit: the neurons naturally represent approximately equal information about the input data. Where the input space has sparse data, the representative Kohonen neurons compact the space. Where the input space has high density, the representative Kohonen neurons spread out to allow finer discrimination.

In step 190, the neighborhood is preferably square, circular or diamond shaped and may alternate between different shapes. Further, the size of the neighborhood may be changed as the learning process proceeds. Preferably, a large neighborhood size is initially specified. This neighborhood size is reduced during the learning process to arrive at a single neuron. In step 190, the routine updates weights of all neurons in the neighborhood of the winning neuron according to the following learning rule:

$$w_{ij}(t+1) = w_{ij}(t) + \alpha(t)[x(t) - w_{ij}(t)] \text{ if } (i,j) \in N_{cicj}(t), \text{ and}$$

otherwise $w_{ij}(t+1) = w_{ij}(t)$.

In the above equations, $N_{cicj}(t)$ is the neighborhood of the unit located at (i,j) at time t, and $\alpha(t)$ is the learning rate at time t.

In step 192, it is necessary to keep track of the winning frequency of each neuron. This frequency is updated after the winning neuron is selected. For purposes of convenience, the following formulas are used to calculate $F_i$ and only approximate the true winning frequency. Thus, for the winning neuron, or the neuron with the lowest adjusted distance:

$$F_{i\_new} = F_{i\_old} + \beta(1.0 - F_{i\_old})$$

For the remaining Kohonen neurons:

$$F_{i\_new} = F_{i\_old} + \beta(0.0 - F_{i\_old})$$

After weights of the neighboring neurons have been adjusted, the learning coefficient $\alpha$ is maintained or decreased over each iteration in step 194. For instance, $\alpha$ may start at a value such as 0.4 and decrease over time to 0.1 or lower. Similarly, the neighborhood $N_{cicj}(t)$ is either maintained or shrunk in step 196.

Next, the routine determines whether the change in the weight values is less than a predetermined threshold in step 198. If not, the routine further determines whether a predetermined maximum iteration limit has been reached in step 200. If the iteration threshold has not been reached, the routine loops back to step 188 to continue the training process. Alternatively, if the change in weight values is less than the determined threshold in step 198, or if the maximum iteration limit has been reached in step 200, the routine exits.

During training, the Kohonen neuron with the smallest distance adjusts its weight to be closer to the values of the input data. The neighbors of the winning neuron also adjust their weights to be closer to the same input data vector. The adjustment of neighboring neurons is instrumental in preserving the order of the input space in the SOM. Statistical methods are used so that the range of inputs converges to a single output. Because the correct output is unknown, the Kohonen SOM assumes that if all the data converges to a particular point, that point must be significant. In each pass through the network, the node with a minimum distance between the input and its weight vector is considered the winner. Every node in the neighborhood is updated so that their weight vectors move toward the winner's vectors. After a series of passes through the network, all inputs tend to converge to a single output.

In this manner, the Kohonen SOM of the preferred embodiment looks for regularities or trends and makes adaptations according to the function of the network while providing a graphical representation of its findings after the SOM has been trained. Advantageously, the two-dimensional vector maintains the order of the multi-dimensional input data. Thus, information is compressed when the Kohonen SOM forms reduced representations of the most relevant facts without loss of knowledge about the interrelationships.

During the recall phase, the Kohonen SOM of the preferred embodiment acts as a two-dimensional map that can, from a random starting point, find the natural relationships among patterns without any external guidance. The Kohonen layer neurons each measure the Euclidean distance of its weights to the incoming input values. The Kohonen neuron with the minimum distance is called the winner and has an output of 1.0, while the other Kohonen neurons have an output of 0.0. A variation of this competitive output has more than one neurons with small Euclidean distance generating a positive output.

During the recall phase, the same Euclidean distance used during training is used to measure distance. In the recall phase, each neuron computes the Euclidean distance between the input vector X and the store weight vector W. Thus, the Euclidean distance $D_i$ is computed for each of the N Kohonen neurons as follows:

$$D_i = \|X - W_i\| = \sqrt{(x_1 - w_{i1})^2 + (x_2 - w_{i2})^2 + \ldots + (x_M - w_{iM})^2}$$

The neuron with the lowest value of $D_i$ is selected as the winner during the recall phase. In the preferred embodiment, each neuron in the output layer 149 represents one data cluster mapping of the input data.

The winning neuron is, in a measurable way, the closest to the input value and thus represents the input value. The ability of the Kohonen SOM clusterizer of the present invention to perform an order-preserving projection of the input space onto the two-dimensional Kohonen output layer allows the Kohonen SOM clusterizer of the present invention to provide a set of data which is more nearly uniformly distributed across the portion of the input space of interest. Further, by filtering out data in portions of the data space with a heavy distribution of data in favor of those with few examples, the present invention supports models which perform better over the entire space as these models effectively minimizes the maximum absolute error over the entire space.

Although the preferred embodiment uses a Kohonen SOM as the clusterizer, the present invention contemplates that other suitable clusterizers can be used, including a k-means clusterizer or a learning vector quantization (LVQ) clusterizer. For instance, as is known by those skilled in the art, the standard euclidean k-means clusterizer finds a set of k cluster centers which represent a local minimum of the total squared euclidean distances E between the k cluster points $x_\alpha$ and N exemplars (training vectors) $x_i$:

$$E = \frac{\Sigma}{\alpha = 1, k} \quad \frac{\Sigma}{i = 1, N} \quad M_{\alpha i}(x_\alpha - x_i)^2,$$

where $M_{\alpha i}$ is the cluster membership function, which is a k×N matrix of 0's and 1's with exactly one 1 per column. The positions of the cluster points $x_\alpha$ are varied to minimize E. The cluster membership function is redetermined in an iterative fashion after each minimization of E such that each exemplar point belongs to the nearest cluster point's cluster. The cycle of E minimization and M redetermination is iterated until E and M reaches a steady state which represents the local minimum for E.

An adaptive formulation of k-means requires no storage of past exemplars $x_i$ or the cluster membership function $M_{\alpha i}$. This formulation, suitable for real-time applications or analog implementation, uses only the current exemplar x(t) as a training signal to modify the nearest cluster vector $x_{closest}$ according to:

$$\frac{\partial}{\partial t} x_{closest}[t] = n(x[t] - x_{closest}[t])$$

where n is a learning rate. The determination of which of the $x_\alpha$ is $x_{closest}$ can be accomplished in log k time on a serial computer, constant time on a parallel computer, or approximately constant time in an analog system via a winner-take-all circuit. The learning rate n can be set initially large and then gradually reduced toward zero according to an annealing schedule as is known in the art.

Although the present invention has discussed Kohonen SOM clusterizers and k-means clusters, the invention also contemplates that alternative neural networks can be used to perform the clustering process, including a learning vector quantization (LVQ) network, as discussed by T. Kohonen, J. Kangas, and K. Torkkola in "LVQ_PAK: A program package for the correct application of Learning Vector Quantization algorithms" *IEEE International Joint Conference on Neural Networks,* Baltimore, Md., pp. I725–730 (Jun. 7–11, 1992).

By sub-sampling the data and minimizing the sum squared error on the sub-sampled data, the present invention minimizes the maximum absolute error over the training set. The benefits of the present invention is illustrated in the results contained in Table 1 and the graphical illustration of FIG. 7. Table 1 and the corresponding graphical illustration of FIG. 7 show that the analyzer trained on selected portions of the data is more accurate than the analyzer trained on all data.

Figure 7:
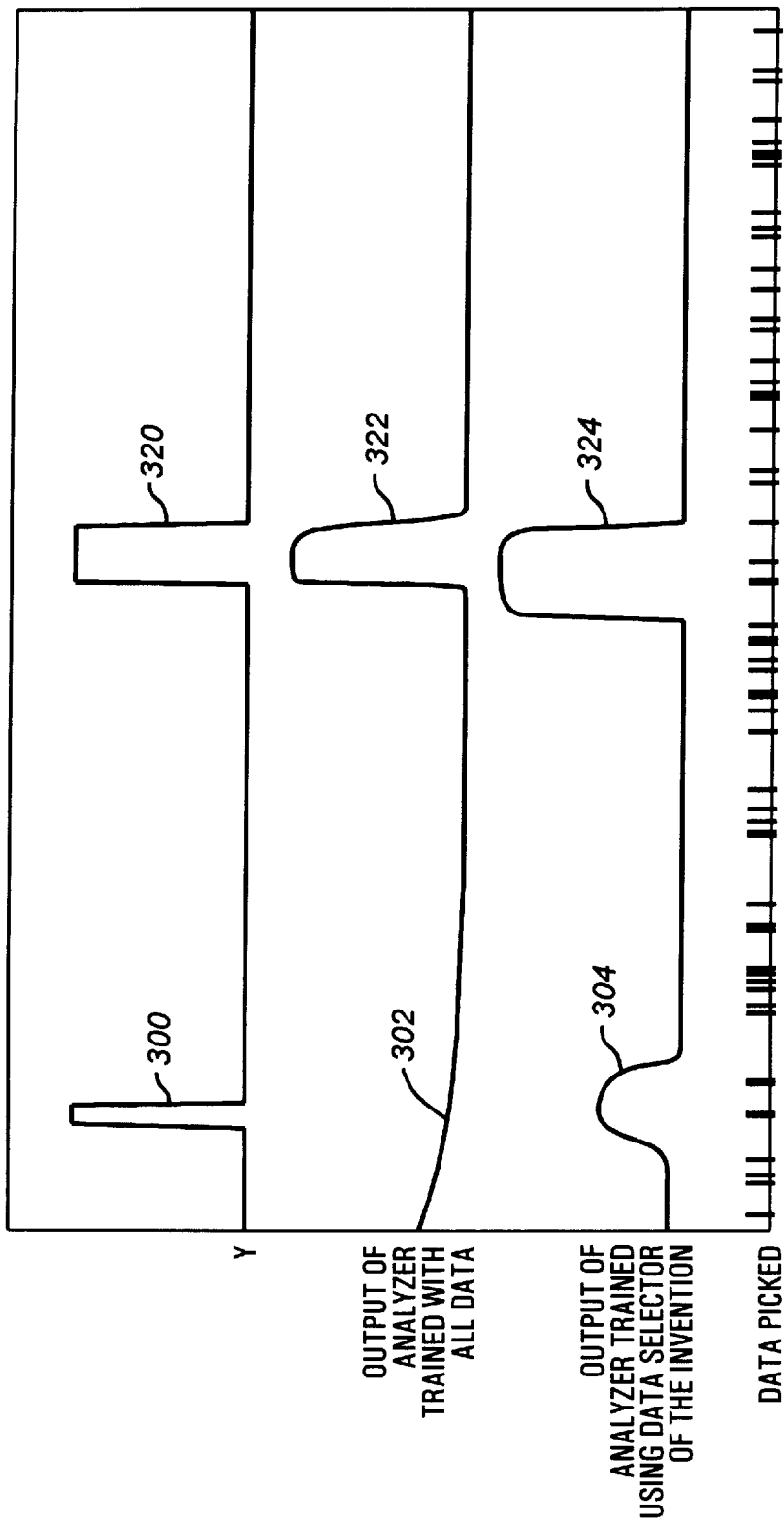
FIG. 7 is a chart comparing results achieved using the data selector of FIGS. 1 and 2 with results using the prior art technique.

Turning now to FIG. 7, the desired result is contrasted with the outputs of the analyzers as trained by all data or by a sub-set of data, as is done by the present invention, is shown. In FIG. 7, a representative data set Y is plotted against a corresponding X data set in the top line of FIG. 7. The results of an indiscriminate application of all data to an analyzer or model during training is shown in the second line of FIG. 7. Further, the results of applying only a selected portion of the training data, as determined by the SOM clusterizer of the present invention, to the analyzer is shown in the third line of FIG. 7. Finally, the fourth line of FIG. 7 illustrates the data selected by the present invention.

The first line of FIG. 7 shows two impulses 300 and 320. Ideally, the analyzer or model should be able to pick up the impulses and reflect the impulses on its respective line in FIG. 7. In the second line of FIG. 7 which corresponds to the column labeled "All" of Table 1, the deficiency of training the analyzer with all data points is shown. Although the analyzer of the second line has picked up the impulse 320 from the original Y data in an impulse 322, the analyzer or model of the second line is not able to pick up the spike 300. In fact, this analyzer behaves poorly in response to the spike 300 with an exponential decay rather than a spike.

Turning now to the third line of FIG. 7 which represents the output generated by the present invention, the third line shows a modulated spike 304 and a spike 324 which correspond to spikes 300 and 320 of the input data. In the fourth line, a number of vertical bars are plotted across the bottom of FIG. 7. Further, under both spikes 300 and 320, there were examples selected by the SOM algorithm of the present invention. Additionally, other points were selected fairly sparsely and uniformly across the more constant parts of the fourth line. The uniform selection of the other points is desirable as representative points from both X and Y data should be included in the training data.

Table 1 shows the data supporting the lines of FIG. 7. In Table 1, the first two columns constitute the data X and Y from which the Y versus X plot of line 1 of FIG. 7 is generated. The analyzer is subsequently trained with all data, or with a subset of the data. These results are illustrated in the third and fourth columns.

The third column of Table labeled "All" is the output of the analyzer which has been trained on all data points. For comparison purposes, the fourth column labeled "SOM" shows the results of the analyzer or model built on training data subselected from the total data using the invention.

Turning now to column 5 of Table 1, various flag values are shown. In Table 1, three types of flags are shown: AWT_V which corresponds to data that the SOM clusterizer of the present invention has chosen to be training data; AW_SV which corresponds to data that the invention has determined to be test data, while A_V indicates that the data is validation data such that the data is not used during the building of the model building. Thus, the data selector of the present invention sub-samples the total data efficiently and sparsely. Further, the present invention picked out important points from the total data set. Thus, by augmenting and subsequently clustering the input vector with the target outputs for the model to be developed, the data selection apparatus of the present invention picks a set of data which is more nearly uniformly distributed across the portion of the input space of interest. Thus, the present invention filters out data in portions of the data space with a heavy distribution of data or examples in favor of those with fewer data or examples.

For modeling techniques which minimize sum squared error (or more generally r-Minkowski error) measures, the data selection apparatus of the present invention results in models which perform better over the entire space as these models effectively minimize the maximum absolute error over the entire space. The data selection apparatus of the present invention thus works well with any modeling technique based on data which optimizes a single composite measure over all of the data used to estimate the model, but the final solution must predict equally well over all the known examples.

The data selection apparatus of the present invention works well with any modeling technique based on data which optimizes a single composite measure over all of the data used to estimate the model, but the final solution must predict equally well over all the known examples. Analyzers or models which can benefit from the working set generated by the present invention include linear models, polynomial models, rational polynomial models, neural networks and other types of data-derived models.

It is to be further understood that the description of data to be collected such as the reflux flow rate and the reboil steam flow rate are associated with the operations of the chemical plant and has only been provided as examples of the types of variables to be collected. The techniques and processes according to the present invention can be utilized in a wide range of technological arts, such as in many other process control environments, particularly multi-variable and more particularly non-linear environment present in a number of plants such as oil refineries, chemical plants, power plants and industrial manufacturing plants, among others. Thus, the present invention is not limited to the description of specific variables collected during the operation of the illustrative plant environment. Additionally, the description of various types of data driven analyzers have only been provided as examples of the types of pattern recognizers that can benefit from the data selection apparatus of the present invention.

Further, the representative applications mentioned such as speech recognition, image recognition, and process control have been provided as examples. Hence, the techniques and processes according to the present invention can be utilized in a wide range of technological arts, such as in many other process control environments such as oil refineries, chemical plants, power plants and industrial manufacturing plants, among others. Thus, the present invention is not limited to the description of specific operating environments.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

TABLE 1

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 0.1 | 0.2 | 0.400938928 | 0.266167372 | A_V |
| 0.105 | 0.2 | 0.396433622 | 0.265721202 | A_V |
| 0.11 | 0.2 | 0.391995519 | 0.265278012 | A_V |
| 0.115 | 0.2 | 0.387625039 | 0.264837891 | A_V |
| 0.12 | 0.2 | 0.383322716 | 0.264400989 | A_V |
| 0.125 | 0.2 | 0.37908864 | 0.263967484 | A_V |
| 0.13 | 0.2 | 0.37492305 | 0.263537735 | AWT_V |
| 0.135 | 0.2 | 0.370826185 | 0.263112158 | A_V |
| 0.14 | 0.2 | 0.366798103 | 0.262691379 | A_V |
| 0.145 | 0.2 | 0.362838745 | 0.262276322 | A_V |
| 0.15 | 0.2 | 0.358948052 | 0.261868268 | A_V |
| 0.155 | 0.2 | 0.355126083 | 0.261469036 | A_V |
| 0.16 | 0.2 | 0.35137257 | 0.261081219 | A_V |
| 0.165 | 0.2 | 0.347687244 | 0.260708511 | A_V |
| 0.17 | 0.2 | 0.344069958 | 0.260356158 | AW_SV |
| 0.175 | 0.2 | 0.340520382 | 0.260031551 | A_V |
| 0.18 | 0.2 | 0.33703807 | 0.25974521 | A_V |
| 0.185 | 0.2 | 0.333622724 | 0.259512067 | A_V |
| 0.19 | 0.2 | 0.330273896 | 0.25935325 | AWT_V |
| 0.195 | 0.2 | 0.326990962 | 0.259298712 | A_V |
| 0.2 | 0.2 | 0.323773563 | 0.25939095 | A_V |
| 0.205 | 0.2 | 0.320621073 | 0.259690166 | AWT_V |
| 0.21 | 0.2 | 0.317532837 | 0.260281742 | A_V |
| 0.215 | 0.2 | 0.314508349 | 0.261286557 | A_V |
| 0.22 | 0.2 | 0.311546862 | 0.262875795 | A_V |
| 0.225 | 0.2 | 0.308647722 | 0.265290827 | A_V |
| 0.23 | 0.2 | 0.305810213 | 0.268869519 | A_V |
| 0.235 | 0.2 | 0.30303365 | 0.274077952 | AWT_V |
| 0.24 | 0.2 | 0.300317198 | 0.281541198 | A_V |
| 0.245 | 0.2 | 0.297660142 | 0.292050153 | AW_SV |
| 0.25 | 0.2 | 0.295061707 | 0.30650565 | A_V |
| 0.255 | 0.2 | 0.29252097 | 0.325729162 | A_V |
| 0.26 | 0.2 | 0.290037274 | 0.350098491 | A_V |
| 0.265 | 0.2 | 0.287609696 | 0.379097641 | A_V |
| 0.27 | 0.2 | 0.285237402 | 0.411074191 | A_V |
| 0.275 | 0.2 | 0.282919496 | 0.443531305 | A_V |
| 0.28 | 0.2 | 0.280655205 | 0.473895788 | A_V |
| 0.285 | 0.2 | 0.278443575 | 0.500279546 | A_V |
| 0.29 | 0.2 | 0.276283771 | 0.521805048 | A_V |
| 0.295 | 1 | 0.274174899 | 0.538466215 | A_V |
| 0.3 | 1 | 0.272116095 | 0.55078572 | A_V |
| 0.305 | 1 | 0.270106465 | 0.559497833 | AW_SV |
| 0.31 | 1 | 0.268145114 | 0.565340996 | A_V |
| 0.315 | 1 | 0.266231179 | 0.568954885 | AWT_V |
| 0.32 | 1 | 0.264363736 | 0.570847929 | AWT_V |
| 0.325 | 1 | 0.26254195 | 0.571398735 | A_V |
| 0.33 | 1 | 0.260764956 | 0.570872128 | A_V |
| 0.335 | 0.2 | 0.259031802 | 0.569438577 | A_V |
| 0.34 | 0.2 | 0.257341683 | 0.56719023 | A_V |
| 0.345 | 0.2 | 0.255693734 | 0.56415534 | A_V |
| 0.35 | 0.2 | 0.254087061 | 0.56030637 | A_V |
| 0.355 | 0.2 | 0.252520859 | 0.555565953 | AW_SV |
| 0.36 | 0.2 | 0.250994265 | 0.549809456 | A_V |
| 0.365 | 0.2 | 0.249506414 | 0.542865455 | A_V |
| 0.37 | 0.2 | 0.248056531 | 0.534514844 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 0.375 | 0.2 | 0.246643782 | 0.524485707 | AWT_V |
| 0.38 | 0.2 | 0.245267317 | 0.512443304 | AWT_V |
| 0.385 | 0.2 | 0.243926406 | 0.497955441 | A_V |
| 0.39 | 0.2 | 0.24262023 | 0.480383456 | A_V |
| 0.395 | 0.2 | 0.241348013 | 0.458518177 | A_V |
| 0.4 | 0.2 | 0.240108967 | 0.429395437 | A_V |
| 0.405 | 0.2 | 0.23890236 | 0.385070503 | A_V |
| 0.41 | 0.2 | 0.237727448 | 0.312992752 | A_V |
| 0.415 | 0.2 | 0.236583486 | 0.240048721 | A_V |
| 0.42 | 0.2 | 0.235469759 | 0.213293597 | A_V |
| 0.425 | 0.2 | 0.23438555 | 0.206853285 | A_V |
| 0.43 | 0.2 | 0.233330175 | 0.204030514 | A_V |
| 0.435 | 0.2 | 0.232302934 | 0.201999247 | A_V |
| 0.44 | 0.2 | 0.231303155 | 0.200407043 | AW_SV |
| 0.445 | 0.2 | 0.230330154 | 0.19918023 | A_V |
| 0.45 | 0.2 | 0.229383335 | 0.198257834 | A_V |
| 0.455 | 0.2 | 0.228462011 | 0.197577149 | A_V |
| 0.46 | 0.2 | 0.227565572 | 0.197080687 | A_V |
| 0.465 | 0.2 | 0.226693407 | 0.196720392 | A_V |
| 0.47 | 0.2 | 0.22584492 | 0.196458817 | A_V |
| 0.475 | 0.2 | 0.225019485 | 0.196267992 | A_V |
| 0.48 | 0.2 | 0.224216551 | 0.196127698 | A_V |
| 0.485 | 0.2 | 0.223435566 | 0.196023554 | A_V |
| 0.49 | 0.2 | 0.222675934 | 0.195945427 | AW_SV |
| 0.495 | 0.2 | 0.221937135 | 0.195886165 | A_V |
| 0.5 | 0.2 | 0.221218646 | 0.195840716 | AW_SV |
| 0.505 | 0.2 | 0.22051993 | 0.195805475 | AWT_V |
| 0.51 | 0.2 | 0.219840482 | 0.195777878 | A_V |
| 0.515 | 0.2 | 0.219179809 | 0.195756018 | A_V |
| 0.52 | 0.2 | 0.21853742 | 0.195738554 | AWT_V |
| 0.525 | 0.2 | 0.217912808 | 0.195724428 | A_V |
| 0.53 | 0.2 | 0.217305571 | 0.195712879 | A_V |
| 0.535 | 0.2 | 0.216715202 | 0.195703343 | A_V |
| 0.54 | 0.2 | 0.216141284 | 0.19569537 | A_V |
| 0.545 | 0.2 | 0.215583354 | 0.195688635 | A_V |
| 0.55 | 0.2 | 0.215041026 | 0.195682839 | AWT_V |
| 0.555 | 0.2 | 0.214513853 | 0.195677817 | A_V |
| 0.56 | 0.2 | 0.214001447 | 0.195673391 | A_V |
| 0.565 | 0.2 | 0.21350342 | 0.195669442 | AWT_V |
| 0.57 | 0.2 | 0.213019356 | 0.195665881 | A_V |
| 0.575 | 0.2 | 0.212548926 | 0.195662618 | A_V |
| 0.58 | 0.2 | 0.212091729 | 0.195659608 | AWT_V |
| 0.585 | 0.2 | 0.211647391 | 0.195656776 | A_V |
| 0.59 | 0.2 | 0.211215615 | 0.195654124 | AWT_V |
| 0.595 | 0.2 | 0.210796028 | 0.195651591 | A_V |
| 0.6 | 0.2 | 0.210388288 | 0.195649162 | A_V |
| 0.605 | 0.2 | 0.209992096 | 0.195646822 | A_V |
| 0.61 | 0.2 | 0.209607139 | 0.195644557 | AW_SV |
| 0.615 | 0.2 | 0.209233075 | 0.195642352 | A_V |
| 0.62 | 0.2 | 0.208869651 | 0.195640191 | A_V |
| 0.625 | 0.2 | 0.208516538 | 0.19563809 | A_V |
| 0.63 | 0.2 | 0.208173469 | 0.195636019 | A_V |
| 0.635 | 0.2 | 0.20784016 | 0.195633978 | A_V |
| 0.64 | 0.2 | 0.207516357 | 0.195631966 | A_V |
| 0.645 | 0.2 | 0.207201764 | 0.195629984 | A_V |
| 0.65 | 0.2 | 0.206896156 | 0.195628017 | A_V |
| 0.655 | 0.2 | 0.20659928 | 0.19562608 | A_V |
| 0.66 | 0.2 | 0.206310868 | 0.195624173 | AWT_V |
| 0.665 | 0.2 | 0.206030712 | 0.195622265 | A_V |
| 0.67 | 0.2 | 0.205758572 | 0.195620388 | AWT_V |
| 0.675 | 0.2 | 0.205494225 | 0.195618525 | A_V |
| 0.68 | 0.2 | 0.205237448 | 0.195616677 | A_V |
| 0.685 | 0.2 | 0.204988033 | 0.195614845 | A_V |
| 0.69 | 0.2 | 0.20474577 | 0.195613042 | A_V |
| 0.695 | 0.2 | 0.204510465 | 0.195611238 | A_V |
| 0.7 | 0.2 | 0.204281911 | 0.19560945 | A_V |
| 0.705 | 0.2 | 0.204059929 | 0.195607677 | A_V |
| 0.71 | 0.2 | 0.203844339 | 0.195605919 | AWT_V |
| 0.715 | 0.2 | 0.203634948 | 0.19560419 | A_V |
| 0.72 | 0.2 | 0.203431576 | 0.195602462 | A_V |
| 0.725 | 0.2 | 0.203234062 | 0.195600733 | AW_SV |
| 0.73 | 0.2 | 0.203042239 | 0.195599034 | A_V |
| 0.735 | 0.2 | 0.202855945 | 0.195597351 | A_V |
| 0.74 | 0.2 | 0.202675015 | 0.195595682 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 0.745 | 0.2 | 0.202499315 | 0.195594013 | A_V |
| 0.75 | 0.2 | 0.202328682 | 0.195592374 | A_V |
| 0.755 | 0.2 | 0.202162981 | 0.195590734 | A_V |
| 0.76 | 0.2 | 0.202002063 | 0.19558911 | A_V |
| 0.765 | 0.2 | 0.201845795 | 0.195587501 | A_V |
| 0.77 | 0.2 | 0.201694041 | 0.195585907 | A_V |
| 0.775 | 0.2 | 0.201546684 | 0.195584312 | A_V |
| 0.78 | 0.2 | 0.201403588 | 0.195582747 | A_V |
| 0.785 | 0.2 | 0.201264635 | 0.195581183 | A_V |
| 0.79 | 0.2 | 0.201129705 | 0.195579633 | AW_SV |
| 0.795 | 0.2 | 0.200998679 | 0.195578098 | A_V |
| 0.8 | 0.2 | 0.200871438 | 0.195576578 | A_V |
| 0.805 | 0.2 | 0.200747907 | 0.195575073 | A_V |
| 0.81 | 0.2 | 0.200627938 | 0.195573568 | A_V |
| 0.815 | 0.2 | 0.200511456 | 0.195572093 | A_V |
| 0.82 | 0.2 | 0.200398356 | 0.195570618 | AW_SV |
| 0.825 | 0.2 | 0.200288534 | 0.195569158 | A_V |
| 0.83 | 0.2 | 0.200181887 | 0.195567697 | A_V |
| 0.835 | 0.2 | 0.200078353 | 0.195566267 | A_V |
| 0.84 | 0.2 | 0.199977815 | 0.195564851 | AWT_V |
| 0.845 | 0.2 | 0.199880198 | 0.195563436 | AWT_V |
| 0.85 | 0.2 | 0.199785426 | 0.195562035 | A_V |
| 0.855 | 0.2 | 0.199693397 | 0.195560664 | AW_SV |
| 0.86 | 0.2 | 0.199604049 | 0.195559293 | A_V |
| 0.865 | 0.2 | 0.199517295 | 0.195557952 | AWT_V |
| 0.87 | 0.2 | 0.199433073 | 0.195556626 | A_V |
| 0.875 | 0.2 | 0.199351281 | 0.195555329 | A_V |
| 0.88 | 0.2 | 0.199271888 | 0.195554063 | A_V |
| 0.885 | 0.2 | 0.199194789 | 0.195552826 | A_V |
| 0.89 | 0.2 | 0.19911994 | 0.195551634 | AWT_V |
| 0.895 | 0.2 | 0.199047267 | 0.195550516 | A_V |
| 0.9 | 0.2 | 0.198976725 | 0.195549473 | A_V |
| 0.905 | 0.2 | 0.198908225 | 0.195548534 | A_V |
| 0.91 | 0.2 | 0.198841706 | 0.19554773 | A_V |
| 0.915 | 0.2 | 0.198777139 | 0.195547119 | A_V |
| 0.92 | 0.2 | 0.19871445 | 0.195546776 | A_V |
| 0.925 | 0.2 | 0.198653594 | 0.195546776 | AWT_V |
| 0.93 | 0.2 | 0.198594511 | 0.195547253 | A_V |
| 0.935 | 0.2 | 0.198537141 | 0.195548385 | A_V |
| 0.94 | 0.2 | 0.198481441 | 0.195550427 | A_V |
| 0.945 | 0.2 | 0.198427364 | 0.195553705 | A_V |
| 0.95 | 0.2 | 0.198374882 | 0.195558697 | A_V |
| 0.955 | 0.2 | 0.198323905 | 0.195566043 | A_V |
| 0.96 | 0.2 | 0.198274434 | 0.195576668 | A_V |
| 0.965 | 0.2 | 0.198226392 | 0.195591792 | A_V |
| 0.97 | 0.2 | 0.198179767 | 0.195613191 | A_V |
| 0.975 | 0.2 | 0.198134497 | 0.195643172 | A_V |
| 0.98 | 0.2 | 0.198090538 | 0.195684835 | A_V |
| 0.985 | 0.2 | 0.198047876 | 0.195742026 | A_V |
| 0.99 | 0.2 | 0.198006451 | 0.19581908 | A_V |
| 0.995 | 0.2 | 0.197966233 | 0.19592008 | A_V |
| 1 | 0.2 | 0.197927192 | 0.1960475 | A_V |
| 1.005 | 0.2 | 0.197889283 | 0.19620055 | A_V |
| 1.01 | 0.2 | 0.197852492 | 0.196374044 | A_V |
| 1.015 | 0.2 | 0.197816774 | 0.196558595 | AW_SV |
| 1.02 | 0.2 | 0.197782099 | 0.196742624 | A_V |
| 1.025 | 0.2 | 0.197748438 | 0.196915135 | A_V |
| 1.03 | 0.2 | 0.197715759 | 0.197067976 | A_V |
| 1.035 | 0.2 | 0.197684035 | 0.197196856 | AWT_V |
| 1.04 | 0.2 | 0.197653234 | 0.197301 | A_V |
| 1.045 | 0.2 | 0.197623342 | 0.197382152 | A_V |
| 1.05 | 0.2 | 0.197594315 | 0.197443351 | A_V |
| 1.055 | 0.2 | 0.197566152 | 0.197488159 | A_V |
| 1.06 | 0.2 | 0.197538808 | 0.197519988 | A_V |
| 1.065 | 0.2 | 0.197512254 | 0.197541878 | AW_SV |
| 1.07 | 0.2 | 0.19748649 | 0.197556362 | A_V |
| 1.075 | 0.2 | 0.197461486 | 0.197565511 | AWT_V |
| 1.08 | 0.2 | 0.197437212 | 0.197570965 | A_V |
| 1.085 | 0.2 | 0.197413653 | 0.197574034 | A_V |
| 1.09 | 0.2 | 0.197390795 | 0.197575763 | A_V |
| 1.095 | 0.2 | 0.197368622 | 0.197577 | AW_SV |
| 1.1 | 0.2 | 0.19734709 | 0.19757852 | AWT_V |
| 1.105 | 0.2 | 0.197326213 | 0.197580963 | A_V |
| 1.11 | 0.2 | 0.197305948 | 0.197584987 | AWT_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 1.115 | 0.2 | 0.197286308 | 0.197591245 | A_V |
| 1.12 | 0.2 | 0.197267249 | 0.197600454 | A_V |
| 1.125 | 0.2 | 0.197248787 | 0.197613373 | A_V |
| 1.13 | 0.2 | 0.19723089 | 0.197630942 | A_V |
| 1.135 | 0.2 | 0.19721356 | 0.197654247 | A_V |
| 1.14 | 0.2 | 0.197196782 | 0.197684646 | A_V |
| 1.145 | 0.2 | 0.197180539 | 0.197723731 | A_V |
| 1.15 | 0.2 | 0.197164848 | 0.197773546 | AWT_V |
| 1.155 | 0.2 | 0.197149694 | 0.197836637 | A_V |
| 1.16 | 0.2 | 0.197135076 | 0.19791618 | A_V |
| 1.165 | 0.2 | 0.197121009 | 0.198016256 | A_V |
| 1.17 | 0.2 | 0.197107494 | 0.198141992 | AWT_V |
| 1.175 | 0.2 | 0.19709453 | 0.19829984 | A_V |
| 1.18 | 0.2 | 0.197082162 | 0.198497549 | A_V |
| 1.185 | 0.2 | 0.19707039 | 0.19874315 | A_V |
| 1.19 | 0.2 | 0.197059244 | 0.199039489 | AW_SV |
| 1.195 | 0.2 | 0.197048798 | 0.199360535 | A_V |
| 1.2 | 0.2 | 0.197039068 | 0.199553803 | AWT_V |
| 1.205 | 0.2 | 0.197030142 | 0.19906801 | A_V |
| 1.21 | 0.2 | 0.197022095 | 0.197423398 | AWT_V |
| 1.215 | 0.2 | 0.197015047 | 0.196308687 | A_V |
| 1.22 | 0.2 | 0.197009102 | 0.19614397 | A_V |
| 1.225 | 0.2 | 0.197004437 | 0.196274444 | A_V |
| 1.23 | 0.2 | 0.197001263 | 0.196515441 | A_V |
| 1.235 | 0.2 | 0.196999818 | 0.19685331 | AWT_V |
| 1.24 | 0.2 | 0.197000429 | 0.197353184 | AW_SV |
| 1.245 | 0.2 | 0.197003469 | 0.199064195 | A_V |
| 1.25 | 0.2 | 0.197009444 | 0.579397142 | A_V |
| 1.255 | 0.2 | 0.197018966 | 0.936837792 | A_V |
| 1.26 | 0.2 | 0.197032794 | 0.974471807 | A_V |
| 1.265 | 0.2 | 0.197051898 | 0.990697742 | A_V |
| 1.27 | 0.2 | 0.197077453 | 1.002442956 | A_V |
| 1.275 | 0.2 | 0.197110906 | 1.011311769 | A_V |
| 1.28 | 0.2 | 0.197153956 | 1.018015742 | A_V |
| 1.285 | 0.2 | 0.197208613 | 1.023089886 | A_V |
| 1.29 | 0.2 | 0.197277188 | 1.026944041 | A_V |
| 1.295 | 0.2 | 0.197364315 | 1.029886723 | A_V |
| 1.3 | 0.2 | 0.197508365 | 1.032146096 | A_V |
| 1.305 | 0.2 | 0.198475286 | 1.03388989 | A_V |
| 1.31 | 0.2 | 0.315118343 | 1.035240889 | A_V |
| 1.315 | 1 | 0.946858585 | 1.036288738 | AWT_V |
| 1.32 | 1 | 0.976945996 | 1.037099123 | AWT_V |
| 1.325 | 1 | 0.981378794 | 1.037719488 | A_V |
| 1.33 | 1 | 0.983849645 | 1.038183093 | A_V |
| 1.335 | 1 | 0.98570317 | 1.038512707 | A_V |
| 1.34 | 1 | 0.987106442 | 1.038721323 | A_V |
| 1.345 | 1 | 0.988126934 | 1.038813591 | A_V |
| 1.35 | 1 | 0.988811433 | 1.038784504 | A_V |
| 1.355 | 1 | 0.989190936 | 1.038618922 | AWT_V |
| 1.36 | 1 | 0.989279091 | 1.038288236 | A_V |
| 1.365 | 1 | 0.989069939 | 1.037744761 | A_V |
| 1.37 | 1 | 0.988532662 | 1.036912918 | AW_SV |
| 1.375 | 1 | 0.98760277 | 1.03567481 | A_V |
| 1.38 | 1 | 0.986166418 | 1.033843994 | A_V |
| 1.385 | 1 | 0.984032035 | 1.031123281 | A_V |
| 1.39 | 1 | 0.980878413 | 1.027035117 | A_V |
| 1.395 | 1 | 0.976158082 | 1.020812035 | A_V |
| 1.4 | 1 | 0.968911052 | 1.011242032 | A_V |
| 1.405 | 1 | 0.957399905 | 0.99650383 | AW_SV |
| 1.41 | 1 | 0.938398123 | 0.974112153 | A_V |
| 1.415 | 1 | 0.905892968 | 0.940693974 | A_V |
| 1.42 | 1 | 0.849297345 | 0.874272227 | A_V |
| 1.425 | 1 | 0.75367105 | 0.43610394 | A_V |
| 1.43 | 0.2 | 0.611054063 | 0.196999744 | AWT_V |
| 1.435 | 0.2 | 0.446994126 | 0.196197987 | A_V |
| 1.44 | 0.2 | 0.316248596 | 0.195978284 | A_V |
| 1.445 | 0.2 | 0.243997797 | 0.195905045 | A_V |
| 1.45 | 0.2 | 0.213463992 | 0.196085155 | A_V |
| 1.455 | 0.2 | 0.202391475 | 0.196785748 | AW_SV |
| 1.46 | 0.2 | 0.198633358 | 0.197706476 | A_V |
| 1.465 | 0.2 | 0.19736667 | 0.198206782 | A_V |
| 1.47 | 0.2 | 0.196924835 | 0.198344961 | A_V |
| 1.475 | 0.2 | 0.196760744 | 0.198336855 | A_V |
| 1.48 | 0.2 | 0.196694762 | 0.198286936 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 1.485 | 0.2 | 0.196665794 | 0.19823201 | A_V |
| 1.49 | 0.2 | 0.196651936 | 0.198183089 | A_V |
| 1.495 | 0.2 | 0.196644738 | 0.198142365 | A_V |
| 1.5 | 0.2 | 0.1966407 | 0.198109254 | A_V |
| 1.505 | 0.2 | 0.196638301 | 0.198082402 | AWT_V |
| 1.51 | 0.2 | 0.196636781 | 0.198060498 | A_V |
| 1.515 | 0.2 | 0.196635783 | 0.198042363 | A_V |
| 1.52 | 0.2 | 0.196635082 | 0.198027089 | A_V |
| 1.525 | 0.2 | 0.196634591 | 0.198013976 | AW_SV |
| 1.53 | 0.2 | 0.196634218 | 0.198002487 | AWT_V |
| 1.535 | 0.2 | 0.196633935 | 0.197992221 | A_V |
| 1.54 | 0.2 | 0.196633711 | 0.197982892 | A_V |
| 1.545 | 0.2 | 0.196633533 | 0.19797425 | A_V |
| 1.55 | 0.2 | 0.196633384 | 0.197966158 | A_V |
| 1.555 | 0.2 | 0.19663325 | 0.197958499 | A_V |
| 1.56 | 0.2 | 0.196633145 | 0.197951168 | A_V |
| 1.565 | 0.2 | 0.196633041 | 0.197944105 | A_V |
| 1.57 | 0.2 | 0.196632966 | 0.197937265 | A_V |
| 1.575 | 0.2 | 0.196632877 | 0.197930619 | A_V |
| 1.58 | 0.2 | 0.196632802 | 0.197924137 | AW_SV |
| 1.585 | 0.2 | 0.196632743 | 0.197917804 | A_V |
| 1.59 | 0.2 | 0.196632668 | 0.197911605 | A_V |
| 1.595 | 0.2 | 0.196632609 | 0.197905526 | A_V |
| 1.6 | 0.2 | 0.196632549 | 0.197899565 | A_V |
| 1.605 | 0.2 | 0.196632504 | 0.197893709 | AWT_V |
| 1.61 | 0.2 | 0.196632445 | 0.197887957 | A_V |
| 1.615 | 0.2 | 0.196632385 | 0.197882324 | A_V |
| 1.62 | 0.2 | 0.196632341 | 0.197876781 | A_V |
| 1.625 | 0.2 | 0.196632296 | 0.197871327 | A_V |
| 1.63 | 0.2 | 0.196632251 | 0.197865978 | A_V |
| 1.635 | 0.2 | 0.196632206 | 0.197860733 | A_V |
| 1.64 | 0.2 | 0.196632162 | 0.197855577 | AW_SV |
| 1.645 | 0.2 | 0.196632117 | 0.19785051 | A_V |
| 1.65 | 0.2 | 0.196632072 | 0.197845533 | AW_SV |
| 1.655 | 0.2 | 0.196632043 | 0.197840661 | A_V |
| 1.66 | 0.2 | 0.196631998 | 0.197835863 | A_V |
| 1.665 | 0.2 | 0.196631968 | 0.197831169 | AWT_V |
| 1.67 | 0.2 | 0.196631923 | 0.197826549 | A_V |
| 1.675 | 0.2 | 0.196631894 | 0.197822034 | AWT_V |
| 1.68 | 0.2 | 0.196631849 | 0.197817594 | A_V |
| 1.685 | 0.2 | 0.196631819 | 0.197813243 | A_V |
| 1.69 | 0.2 | 0.196631789 | 0.197808981 | A_V |
| 1.695 | 0.2 | 0.196631759 | 0.197804794 | AWT_V |
| 1.7 | 0.2 | 0.19663173 | 0.197800696 | A_V |
| 1.705 | 0.2 | 0.1966317 | 0.197796673 | A_V |
| 1.71 | 0.2 | 0.19663167 | 0.197792739 | A_V |
| 1.715 | 0.2 | 0.19663164 | 0.197788894 | A_V |
| 1.72 | 0.2 | 0.19663161 | 0.197785124 | A_V |
| 1.725 | 0.2 | 0.196631595 | 0.197781429 | A_V |
| 1.73 | 0.2 | 0.196631566 | 0.197777808 | A_V |
| 1.735 | 0.2 | 0.196631536 | 0.197774276 | AWT_V |
| 1.74 | 0.2 | 0.196631521 | 0.197770819 | A_V |
| 1.745 | 0.2 | 0.196631491 | 0.197767422 | A_V |
| 1.75 | 0.2 | 0.196631476 | 0.197764114 | A_V |
| 1.755 | 0.2 | 0.196631446 | 0.19776088 | AW_SV |
| 1.76 | 0.2 | 0.196631432 | 0.197757706 | A_V |
| 1.765 | 0.2 | 0.196631402 | 0.197754622 | A_V |
| 1.77 | 0.2 | 0.196631387 | 0.197751597 | A_V |
| 1.775 | 0.2 | 0.196631372 | 0.197748646 | A_V |
| 1.78 | 0.2 | 0.196631342 | 0.197745755 | A_V |
| 1.785 | 0.2 | 0.196631327 | 0.197742939 | A_V |
| 1.79 | 0.2 | 0.196631312 | 0.197740182 | A_V |
| 1.795 | 0.2 | 0.196631297 | 0.1977375 | AWT_V |
| 1.8 | 0.2 | 0.196631283 | 0.197734877 | A_V |
| 1.805 | 0.2 | 0.196631268 | 0.197732329 | A_V |
| 1.81 | 0.2 | 0.196631253 | 0.197729826 | A_V |
| 1.815 | 0.2 | 0.196631238 | 0.197727397 | AWT_V |
| 1.82 | 0.2 | 0.196631223 | 0.197725028 | A_V |
| 1.825 | 0.2 | 0.196631208 | 0.197722718 | A_V |
| 1.83 | 0.2 | 0.196631193 | 0.197720453 | A_V |
| 1.835 | 0.2 | 0.196631178 | 0.197718263 | A_V |
| 1.84 | 0.2 | 0.196631163 | 0.197716117 | A_V |
| 1.845 | 0.2 | 0.196631148 | 0.197714031 | A_V |
| 1.85 | 0.2 | 0.196631134 | 0.197712004 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 1.855 | 0.2 | 0.196631119 | 0.197710022 | A_V |
| 1.86 | 0.2 | 0.196631119 | 0.197708085 | A_V |
| 1.865 | 0.2 | 0.196631104 | 0.197706208 | A_V |
| 1.87 | 0.2 | 0.196631089 | 0.197704375 | AWT_V |
| 1.875 | 0.2 | 0.196631074 | 0.197702602 | A_V |
| 1.88 | 0.2 | 0.196631074 | 0.197700873 | AW_SV |
| 1.885 | 0.2 | 0.196631059 | 0.197699174 | A_V |
| 1.89 | 0.2 | 0.196631044 | 0.197697535 | A_V |
| 1.895 | 0.2 | 0.196631044 | 0.197695926 | A_V |
| 1.9 | 0.2 | 0.196631029 | 0.197694376 | A_V |
| 1.905 | 0.2 | 0.196631014 | 0.197692856 | A_V |
| 1.91 | 0.2 | 0.196631014 | 0.197691381 | AWT_V |
| 1.915 | 0.2 | 0.196630999 | 0.197689936 | A_V |
| 1.92 | 0.2 | 0.196630999 | 0.197688535 | A_V |
| 1.925 | 0.2 | 0.196630985 | 0.197687164 | A_V |
| 1.93 | 0.2 | 0.196630985 | 0.197685838 | AW_SV |
| 1.935 | 0.2 | 0.19663097 | 0.197684541 | A_V |
| 1.94 | 0.2 | 0.19663097 | 0.197683275 | A_V |
| 1.945 | 0.2 | 0.196630955 | 0.197682038 | A_V |
| 1.95 | 0.2 | 0.196630955 | 0.197680831 | A_V |
| 1.955 | 0.2 | 0.19663094 | 0.197679654 | A_V |
| 1.96 | 0.2 | 0.19663094 | 0.197678491 | A_V |
| 1.965 | 0.2 | 0.19663094 | 0.197677374 | A_V |
| 1.97 | 0.2 | 0.196630925 | 0.197676271 | AWT_V |
| 1.975 | 0.2 | 0.196630925 | 0.197675198 | A_V |
| 1.98 | 0.2 | 0.19663091 | 0.19767414 | A_V |
| 1.985 | 0.2 | 0.19663091 | 0.197673097 | AWT_V |
| 1.99 | 0.2 | 0.19663091 | 0.197672084 | A_V |
| 1.995 | 0.2 | 0.196630895 | 0.197671086 | A_V |
| 2 | 0.2 | 0.196630895 | 0.197670102 | A_V |
| 2.005 | 0.2 | 0.196630895 | 0.197669134 | AW_SV |
| 2.01 | 0.2 | 0.19663088 | 0.197668195 | A_V |
| 2.015 | 0.2 | 0.19663088 | 0.197667241 | AWT_V |
| 2.02 | 0.2 | 0.19663088 | 0.197666317 | A_V |
| 2.025 | 0.2 | 0.196630865 | 0.197665393 | A_V |
| 2.03 | 0.2 | 0.196630865 | 0.197664484 | A_V |
| 2.035 | 0.2 | 0.196630865 | 0.19766359 | A_V |
| 2.04 | 0.2 | 0.196630865 | 0.197662681 | A_V |
| 2.045 | 0.2 | 0.19663085 | 0.197661787 | A_V |
| 2.05 | 0.2 | 0.19663085 | 0.197660908 | A_V |
| 2.055 | 0.2 | 0.19663085 | 0.197660014 | A_V |
| 2.06 | 0.2 | 0.196630836 | 0.19765912 | A_V |
| 2.065 | 0.2 | 0.196630836 | 0.197658241 | A_V |
| 2.07 | 0.2 | 0.196630836 | 0.197657347 | A_V |
| 2.075 | 0.2 | 0.196630836 | 0.197656453 | A_V |
| 2.08 | 0.2 | 0.196630836 | 0.197655559 | A_V |
| 2.085 | 0.2 | 0.196630821 | 0.197665465 | A_V |
| 2.09 | 0.2 | 0.196630821 | 0.197653741 | A_V |
| 2.095 | 0.2 | 0.196630821 | 0.197652817 | A_V |
| 2.1 | 0.2 | 0.196630821 | 0.197651878 | A_V |
| 2.105 | 0.2 | 0.196630821 | 0.197650939 | AWT_V |
| 2.11 | 0.2 | 0.196630806 | 0.197649986 | A_V |
| 2.115 | 0.2 | 0.196630806 | 0.197649017 | A_V |
| 2.12 | 0.2 | 0.196630806 | 0.197648033 | AWT_V |
| 2.125 | 0.2 | 0.196630806 | 0.19764702 | A_V |
| 2.13 | 0.2 | 0.196630806 | 0.197646007 | AWT_V |
| 2.135 | 0.2 | 0.196630806 | 0.197644964 | A_V |
| 2.14 | 0.2 | 0.196630806 | 0.197643906 | A_V |
| 2.145 | 0.2 | 0.196630791 | 0.197642833 | A_V |
| 2.15 | 0.2 | 0.196630791 | 0.19764173 | AWT_V |
| 2.155 | 0.2 | 0.196630791 | 0.197640598 | A_V |
| 2.16 | 0.2 | 0.196630791 | 0.19763945 | A_V |
| 2.165 | 0.2 | 0.196630791 | 0.197638273 | A_V |
| 2.17 | 0.2 | 0.196630791 | 0.197637066 | AW_SV |
| 2.175 | 0.2 | 0.196630791 | 0.197635829 | AW_SV |
| 2.18 | 0.2 | 0.196630776 | 0.197634563 | A_V |
| 2.185 | 0.2 | 0.196630776 | 0.197633266 | A_V |
| 2.19 | 0.2 | 0.196630776 | 0.19763194 | AWT_V |
| 2.195 | 0.2 | 0.196630776 | 0.197630584 | A_V |
| 2.2 | 0.2 | 0.196630776 | 0.197629184 | A_V |
| 2.205 | 0.2 | 0.196630776 | 0.197627753 | A_V |
| 2.21 | 0.2 | 0.196630776 | 0.197626278 | A_V |
| 2.215 | 0.2 | 0.196630776 | 0.197624773 | A_V |
| 2.22 | 0.2 | 0.196630776 | 0.197623238 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 2.225 | 0.2 | 0.196630776 | 0.197621658 | AW_SV |
| 2.23 | 0.2 | 0.196630761 | 0.197620034 | A_V |
| 2.235 | 0.2 | 0.196630761 | 0.197618365 | A_V |
| 2.24 | 0.2 | 0.196630761 | 0.197616652 | A_V |
| 2.245 | 0.2 | 0.196630761 | 0.197614908 | A_V |
| 2.25 | 0.2 | 0.196630761 | 0.197613105 | A_V |
| 2.255 | 0.2 | 0.196630761 | 0.197611272 | AW_SV |
| 2.26 | 0.2 | 0.196630761 | 0.19760938 | A_V |
| 2.265 | 0.2 | 0.196630761 | 0.197607443 | AWT_V |
| 2.27 | 0.2 | 0.196630761 | 0.197605461 | A_V |
| 2.275 | 0.2 | 0.196630761 | 0.197603434 | A_V |
| 2.28 | 0.2 | 0.196630761 | 0.197601363 | A_V |
| 2.285 | 0.2 | 0.196630761 | 0.197599232 | AWT_V |
| 2.29 | 0.2 | 0.196630761 | 0.197597042 | A_V |
| 2.295 | 0.2 | 0.196630761 | 0.197594807 | A_V |
| 2.3 | 0.2 | 0.196630746 | 0.197592527 | A_V |
| 2.305 | 0.2 | 0.196630746 | 0.197590187 | A_V |
| 2.31 | 0.2 | 0.196630746 | 0.197587803 | A_V |
| 2.315 | 0.2 | 0.196630746 | 0.197585359 | A_V |
| 2.32 | 0.2 | 0.196630746 | 0.197582856 | A_V |
| 2.325 | 0.2 | 0.196630746 | 0.197580293 | A_V |
| 2.33 | 0.2 | 0.196630746 | 0.197577685 | A_V |
| 2.335 | 0.2 | 0.196630746 | 0.197575018 | A_V |
| 2.34 | 0.2 | 0.196630746 | 0.197572291 | A_V |
| 2.345 | 0.2 | 0.196630746 | 0.197569504 | A_V |
| 2.35 | 0.2 | 0.196630746 | 0.197566658 | A_V |
| 2.355 | 0.2 | 0.196630746 | 0.197563767 | A_V |
| 2.36 | 0.2 | 0.196630746 | 0.197560802 | AWT_V |
| 2.365 | 0.2 | 0.196630746 | 0.197557792 | A_V |
| 2.37 | 0.2 | 0.196630746 | 0.197554708 | A_V |
| 2.375 | 0.2 | 0.196630746 | 0.197551563 | A_V |
| 2.38 | 0.2 | 0.196630746 | 0.197548375 | AW_SV |
| 2.385 | 0.2 | 0.196630746 | 0.197545111 | A_V |
| 2.39 | 0.2 | 0.196630746 | 0.197541788 | A_V |
| 2.395 | 0.2 | 0.196630746 | 0.197538406 | A_V |
| 2.4 | 0.2 | 0.196630746 | 0.197534963 | A_V |
| 2.405 | 0.2 | 0.196630746 | 0.197531462 | A_V |
| 2.41 | 0.2 | 0.196630746 | 0.1975279 | A_V |
| 2.415 | 0.2 | 0.196630746 | 0.197524279 | AWT_V |
| 2.42 | 0.2 | 0.196630746 | 0.197520584 | AWT_V |
| 2.425 | 0.2 | 0.196630731 | 0.197516829 | AWT_V |
| 2.43 | 0.2 | 0.196630731 | 0.197513014 | A_V |
| 2.435 | 0.2 | 0.196630731 | 0.19750914 | AWT_V |
| 2.44 | 0.2 | 0.196630731 | 0.197505206 | AW_SV |
| 2.445 | 0.2 | 0.196630731 | 0.197501212 | A_V |
| 2.45 | 0.2 | 0.196630731 | 0.197497144 | A_V |
| 2.455 | 0.2 | 0.196630731 | 0.197493032 | A_V |
| 2.46 | 0.2 | 0.196630731 | 0.197488844 | A_V |
| 2.465 | 0.2 | 0.196630731 | 0.197484598 | AWT_V |
| 2.47 | 0.2 | 0.196630731 | 0.197480291 | A_V |
| 2.475 | 0.2 | 0.196630731 | 0.19747591 | A_V |
| 2.48 | 0.2 | 0.196630731 | 0.19741485 | A_V |
| 2.485 | 0.2 | 0.196630731 | 0.197466999 | A_V |
| 2.49 | 0.2 | 0.196630731 | 0.19746244 | A_V |
| 2.495 | 0.2 | 0.196630731 | 0.19745782 | A_V |
| 2.5 | 0.2 | 0.196630731 | 0.197453156 | A_V |
| 2.505 | 0.2 | 0.196630731 | 0.197448418 | A_V |
| 2.51 | 0.2 | 0.196630731 | 0.197443619 | AWT_V |
| 2.515 | 0.2 | 0.196630731 | 0.197438762 | A_V |
| 2.52 | 0.2 | 0.196630731 | 0.197433859 | A_V |
| 2.525 | 0.2 | 0.196630731 | 0.197428882 | AW_SV |
| 2.53 | 0.2 | 0.196630731 | 0.197423846 | A_V |
| 2.535 | 0.2 | 0.196630731 | 0.197418764 | A_V |
| 2.54 | 0.2 | 0.196630731 | 0.197413623 | A_V |
| 2.545 | 0.2 | 0.196630731 | 0.197408423 | A_V |
| 2.55 | 0.2 | 0.196630731 | 0.197403148 | A_V |
| 2.555 | 0.2 | 0.196630731 | 0.197397843 | A_V |
| 2.56 | 0.2 | 0.196630731 | 0.197392464 | A_V |
| 2.565 | 0.2 | 0.196630731 | 0.19738704 | A_V |
| 2.57 | 0.2 | 0.196630731 | 0.197381556 | A_V |
| 2.575 | 0.2 | 0.196630731 | 0.197376028 | AW_SV |
| 2.58 | 0.2 | 0.196630731 | 0.19737044 | A_V |
| 2.585 | 0.2 | 0.196630731 | 0.197364792 | A_V |

TABLE 1-continued

DATA SUPPORT FOR FIG. 7

| DATA SET X | DATA SET Y | RESULT WHEN TRAINED W. All | RESULT WHEN TRAINE W. SOM | MEMBERSHIP Flags |
|---|---|---|---|---|
| 2.59 | 0.2 | 0.196630731 | 0.1973591 | A_V |
| 2.595 | 0.2 | 0.196630731 | 0.197353348 | A_V |

We claim:

1. A method for generating a working set of data from a full set of data in a computer for building an analyzer, said analyzer having target outputs, said method comprising the steps of:

augmenting said full set of data with the target outputs;

normalizing said augmented data;

clustering said augmented and normalized data; and selecting one or more members of said clusterized data as said working set of data.

2. The method of claim 1, wherein said clustering step further comprises the step of selecting a subset of said augmented and normalized data.

3. The method of claim 1, wherein said augmenting step further comprises the step of selecting a portion of said full set of data and a portion of said target outputs.

4. The method of claim 1, further comprising the step of applying univariate, non-linear transformations to said augmented and normalized data prior to said clustering step.

5. The method of claim 1, wherein said clustering step uses a weighted distribution.

6. The method of claim 1, wherein said clustering step uses an equi-probable distribution.

7. The method of claim 1, wherein said clustering step further comprises the step of emphasizing said outputs.

8. The method of claim 1, wherein said clustering step uses a statistical technique.

9. The method of the claim 8, wherein said statistical technique is a K-means technique.

10. The method of claim 1, wherein said clustering step is performed by a neural network.

11. The method of claim 10, wherein said neural network is a learning vector quantization neural network.

12. The method of claim 10, wherein said neural network is a self organizing map.

13. The method of claim 1, wherein said normalizing step further comprises the step of detecting and removing outliers in the data.

14. The method of claim 1, further comprising the step of building an analyzer using said working set of data.

15. The method of claim 1, further comprising the step of iteratively selecting data to create one or more analyzers.

16. The method of claim 15, further comprising the step of completing said iterating step when a cutoff level is reached.

17. The method of claim 1, further comprising the step of:

matching each example in a training set to a cluster based on said full set of data;

uniquely associating an analyzer with a cluster;

assigning a recall data to a cluster; and applying said analyzer associated with said cluster to said recall data to provide an output.

18. An apparatus for generating a working set of data from a full set of data in a computer for building an analyzer, said analyzer having target outputs, said apparatus comprising:

a cumulator for augmenting said full set of data with the target outputs;

an adjuster coupled to said cumulator for normalizing said augmented data;

a clusterizer coupled to said adjuster for clustering said augmented and normalized data; and a selector coupled to said clusterizer for picking one or more members of said clusterized data as said working set of data.

19. The apparatus of claim 18, wherein said adjuster further comprises a sub-sampler for selecting a subset of said augmented and normalized data.

20. The apparatus of claim 18, wherein said cumulator further comprises a sub-sampler for selecting a portion of said full set of data and a portion of said target outputs.

21. The apparatus of claim 18, further comprising a transformer coupled between said adjuster and said clusterizer for performing univariate, non-linear transformations to said augmented and normalized data.

22. The apparatus of claim 18, wherein said clusterizer uses a weighted distribution.

23. The apparatus of claim 18, wherein said clusterizer uses an equi-probable distribution.

24. The apparatus of claim 18, wherein said outputs are emphasized by said clusterizer.

25. The apparatus of claim 18, wherein said clusterizer uses a statistical technique.

26. The apparatus of the claim 25, wherein said statistical technique is a K-means technique.

27. The apparatus of claim 18, wherein said clusterizer is a neural network.

28. The apparatus of claim 27, wherein said neural network is a learning vector quantization neural network.

29. The apparatus of claim 27, wherein said neural network is a self organizing map.

30. The apparatus of claim 18, wherein said adjuster further comprises:

a non-parametric outlier detector; and a scaler coupled to said non-parametric outlier detector.

31. The apparatus of claim 18, further comprising an analyzer formed from said working set of data.

32. The apparatus of claim 31, further comprising an analyzer generator, said model generator iteratively picking said working set of data to create one or more of analyzers until an optimal analyzer is found.

33. A program storage device having a computer readable program code embodied therein for generating a working set of data from a full set of data to build an analyzer, said analyzer having target outputs, said program storage device comprising:

a cumulator code for augmenting said full set of data with the target outputs;

an adjuster code coupled to said cumulator code for normalizing said augmented data;

a clusterizer code coupled to said adjuster code for clustering said augmented and normalized data; and a selector code coupled to said clusterizer code for picking one or more members of said clusterized data as said working set of data.

* * * * *